July 21, 1970 C. J. MAY, JR 3,520,999
DIGITAL SPEECH DETECTION SYSTEM
Filed March 27, 1967 12 Sheets-Sheet 1
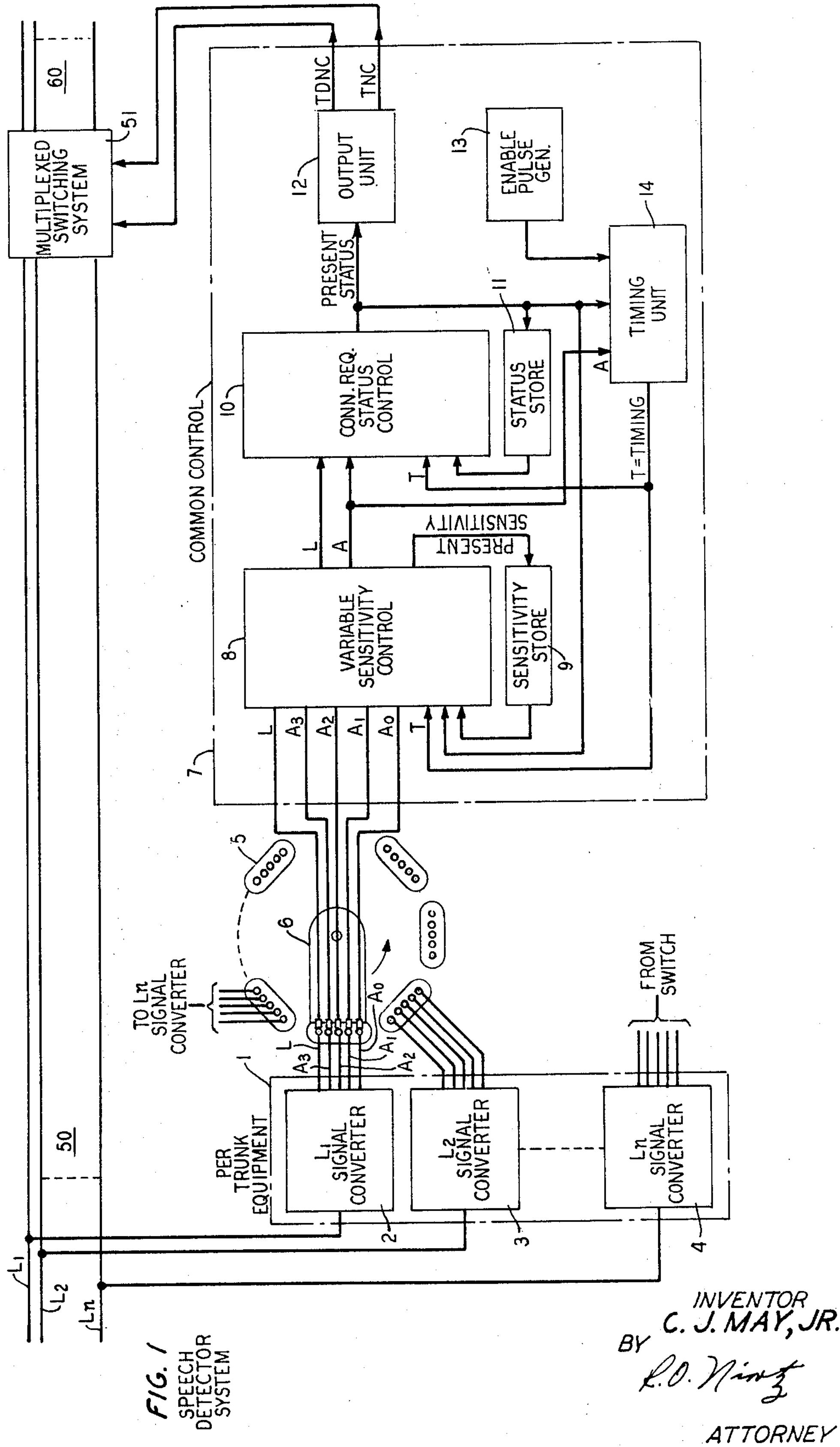
FIG. 1 SPEECH DETECTOR SYSTEM
INVENTOR
C. J. MAY, JR.
BY R. O. Nimtz
ATTORNEY July 21, 1970 C. J. MAY, JR 3,520,999

DIGITAL SPEECH DETECTION SYSTEM

Filed March 27, 1967 12 Sheets-Sheet 2

DIGITAL SPEECH DETECTION SYSTEM

Filed March 27, 1967 12 Sheets-Sheet 3

SPEECH DETECTOR SYSTEM

FIG. 4A
STATUS CONTROL STATE DIAGRAM
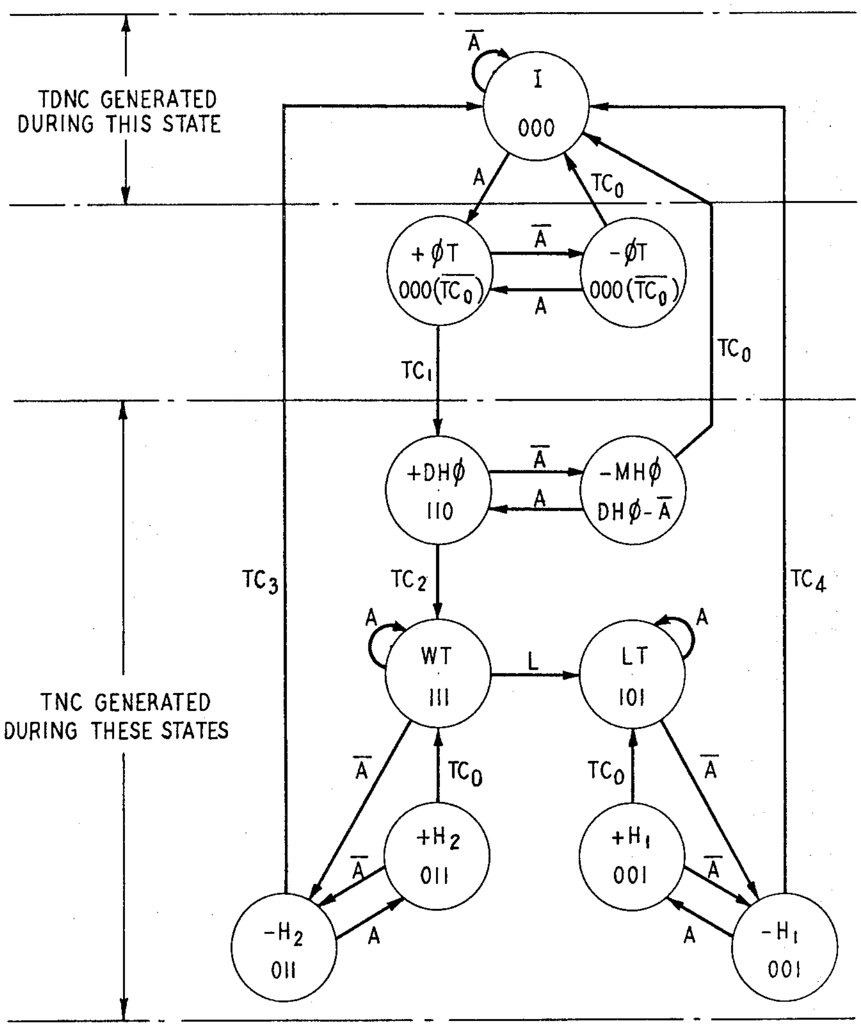
FIG. 3
SENSITIVITY CONTROL STATE DIAGRAM
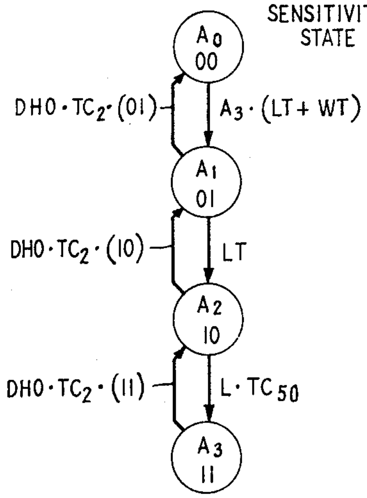
FIG. 4B
| $TC_1$ | $TC_2$ | $TC_3$ | $TC_4$ |
|---|---|---|---|
| 5.2 MS | 45 MS | 320 MS | 120 MS |

July 21, 1970 C. J. MAY, JR 3,520,999

DIGITAL SPEECH DETECTION SYSTEM

Filed March 27, 1967 12 Sheets-Sheet 5

STATUS CONTROL LOGIC

July 21, 1970 C. J. MAY, JR 3,520,999

DIGITAL SPEECH DETECTION SYSTEM

Filed March 27, 1967 12 Sheets-Sheet 6

STATUS STORE LOGIC

TIMING CONTROL LOGIC

OUTPUT LOGIC

SPEECH DETECTOR ARITHMETIC UNIT

July 21, 1970 C. J. MAY, JR 3,520,999

DIGITAL SPEECH DETECTION SYSTEM

Filed March 27, 1967 12 Sheets-Sheet 8

SENSITIVITY CONTROL

GRANULARITY PULSES

SIGNAL LEVEL DETECTOR CIRCUIT

FOUR ACTIVITY SIGNAL SYSTEM VARIABLE SENSITIVITY

July 21, 1970 C. J. MAY, JR 3,520,999

DIGITAL SPEECH DETECTION SYSTEM

Filed March 27, 1967 12 Sheets-Sheet 11

FOUR ACTIVITY SIGNAL SYSTEM STATUS CONTROL

United States Patent Office 3,520,999

Patented July 21, 1970

3,520,999

DIGITAL SPEECH DETECTION SYSTEM

Carl J. May, Jr., Holmdel, N.J., assignor to Bell Telephone Laboratories, Incorporated, Murray Hill and Berkeley Heights, N.J., a corporation of New York Filed Mar. 27, 1967, Ser. No. 626,055

Int. Cl. H04j 5/00

U.S. Cl. 179—15 24 Claims

ABSTRACT OF THE DISCLOSURE

A common time-shared speech detector is disclosed in which digital status and timing information for a plurality of speech lines are stored in circulating delay loops and processed in time sequence with common digital circuitry. Variable sensitivity is achieved by varying digital reference values for the lines which are also stored in circulating delay loops. Operate time, delay before hangover and hangover are timed by multiplexed digital timing signals and varied in response to the line activity signals to better accommodate talkers with different speech intensities. The output comprises time-slotted requests for connection or disconnection which can be used in a time assignment speech interpolation system.

BACKGROUND OF THE INVENTION

Field of the invention

This invention relates to signal detecting systems and, more particularly, to the translation of signal amplitude levels on a large number of lines into one of a plurality of connection requirement statuses for each line, representing the respective activities of the lines.

Description of the prior art

In many multiplex signal transmission systems, operation depends upon the respective activity of a large number of signal sources. An example of such a system is the Time. Assignment Speech Interpolation (TASI) System. Ideally, this system increases the number of signal sources it can switch over a fixed number of transmission lines by connecting a talker and a listener only when the talker is actually speaking. One embodiment of a TASI is shown in A. R. Kolding et al. Pat. 2,957,946, granted Oct. 25, 1960.

Relatively recently, a method of detecting speech from a plurality of signal sources was disclosed by F. A. Saal Pat. 3,030,447, granted Apr. 17, 1962, which uses a common, time-shared means of detection. This is accomplished by repetitively sampling the signal level of each signal source at regular intervals and providing storage space in a common storage means for $n$ successive samples of each signal source. Each time a signal source is sampled, the new sample is combined with the $n-1$ preceding samples from that source and compared with some predetermined constant to see if the sampled signal levels were high enough to indicate that the signal source is active. If they were, an activity signal is generated which results in the sample signal source being connected to one of the transmisison lines in the transmission system.

This arrangement does away with the problem which existed in the past of having to provide duplicate speech detectors for each signal source. However, such a system is relatively inflexible since it does not take into account the fact that different people speak with varying degrees of loudness. If a person is a loud talker, a less sensitive speech detector can be used to detect his speech than is used for a weak talker, and the response to noise can be minimized. Also, a loud talker needs less hangover than a weak talker. Consequently, this system does not allow the time-shared detection means to be used at maximum efficiency and hence the ratio of signal sources to transmission lines cannot be maximized.

It is on object of this invention to use a common time-shared means for statistically analyzing repetitive samples of source signal levels to determine the respective activity status of each of a plurality of sources.

It is a further object of the present invention to increase the signal-source-to-transmission-line ratio of TASI systems using a common time-shared speech detector.

A more specific object of the invention is to provide a common, time-shared speech detector with the capability of differentiating between varying degrees of speech amplitude for different people and adjusting its operating characteristics so a connection exit only long enough to tranmit speech accurately.

Another specific object of the invention is to provide a common, time-shared speech detector with variable sensitivity that can be varied both as different signal sources are sampled and for the same signal source from sample to sample.

A still further specific object of the invention is to provide a common time-shared speech detector with the capability of varying operate time, deferred hangover and full hangover as a function of speech amplitude.

SUMMARY OF THE INVENTION

In accordance with the present invention, signals on a plurality of lines are sampled repetitively at regular intervals. As each line is sampled, common means compare the sampled signal amplitude with a prescribed sensitivity reference value, which is variable, to determine if the signal amplitude on that line is sufficient to indicate that the line is active. If the signal amplitude is sufficient, a line activity signal is generated. In addition, if the signal is high enough, a loud talker signal will also be generated. Common means then compare the line activity signal and the loud talker signal with the past connection requirement status of the line, and with timing signals, to determine its present connection requirement status. The present connection requirement status includes variable hangover information as well as connection requirement information. The present connection requirement status is then detected and a connect or disconnect signal is generated accordingly. The connect signal results in the source line being connected to a transmission line and the disconnect signal results in the source line being disconnected from a transmission line.

The major advantages of this common speech detector lie in allowing more signal sources to be handled on a fixed number of transmission lines by minimizing the time a talker is connected. Furthermore, the system is very flexible since the common equipment can be modified or expanded at greatly reduced costs.

These and other objects and features, the nature of the present invention and its various advantages, will be more fully understood upon consideration of the attached drawings and of the following detailed description of the drawings.

BRIEF DESCRIPTION OF THE DRAWINGS

In the drawings:

FIG. 1 is a schematic block diagram of the major components of a time-shared speech detector system in accordance with the present invention, and showing its interconnection in a TASI system;

FIG. 3 is a state diagram representing the operation of the variable sensitivity control in accordance with the present invention;

FIG. 4A is a state diagram representing the operation of the connection requirement status control in accordance with the invention;

FIG. 4B shows some empirically determined intervals represented by the occurrence of various timing compare signals denoted as $TC_i$ in FIG. 4A;

GENERAL DESCRIPTION OF THE INVENTION

The problem of detecting speech effectively in a TASI system is a difficult one. On the one hand, it is necessary to insure that when speech is present the talker is connected to a transmission line. On the other hand, in order to maximize the TASI advantage, it is necessary to insure that the talker is only connected when he is actually speaking.

Since the ultimate judgment of the quality of speech detection is a subjective one made by the listener, no single criterion can be established as a measure of the quality of speech detector transmission. The speech of different individuals varies in both frequency spectrum and amplitude; and the sensitivity of the listener's hearing also varies from individual to individual. Therefore, any criteria used in detecting speech efficiently must depend upon statistical distributions taking into consideration variations in speech and hearing from individual to individual.

One method for determining such statistical distributions is to record the reaction of a sample of listeners listening to a sample of talkers as speech detector operational parameters are varied. Two speech detector parameters which are of key importance are sensitivity and activity. Sensitivity relates to the amplitude a speech signal must reach before it will be acted upon by the speech detector. Activity relates to the various states a speech detector goes through once it begins to act upon a signal. It includes such characteristics as operate-time and hangover. Optimal speech detector operation is dependent upon both its sensitivity and activity characteristics. A particular speaker may be served equally well using various values of these two parameters; that is, low sensitivity may be offset by using a short operate time and a long hangover.

Figure 14:
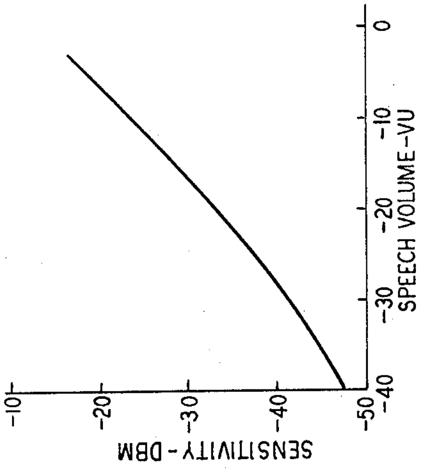
FIG. 14 shows an empirically determined distribution of sensitivity as a function of signal amplitude on a line.

FIG. 14 shows an empirically determined distribution of the speech detector sensitivity required for high quality speech transmission. It will be noted that, within certain bounds, as the amplitude of the speech signal increases the required sensitivity for high quality transmission decreases.

Figure 15:
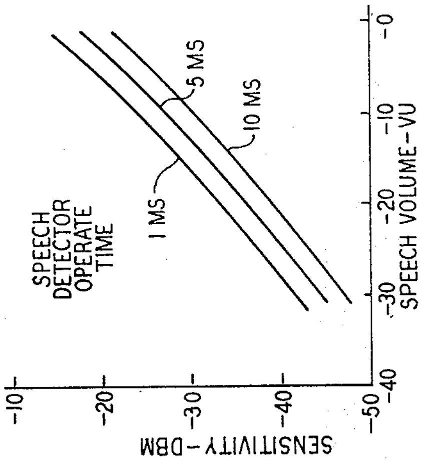
FIG. 15 shows an empirically determined distribution of sensitivity as a function of operate time.

FIG. 15 shows an empirically determined distribution of speech detection sensitivity as a function of operate time. This distribution shows that for an increase in operate time from 5 ms. to 10 ms. the sensitivity must be increased by 3 db to maintain equal speech quality.

Figure 16:
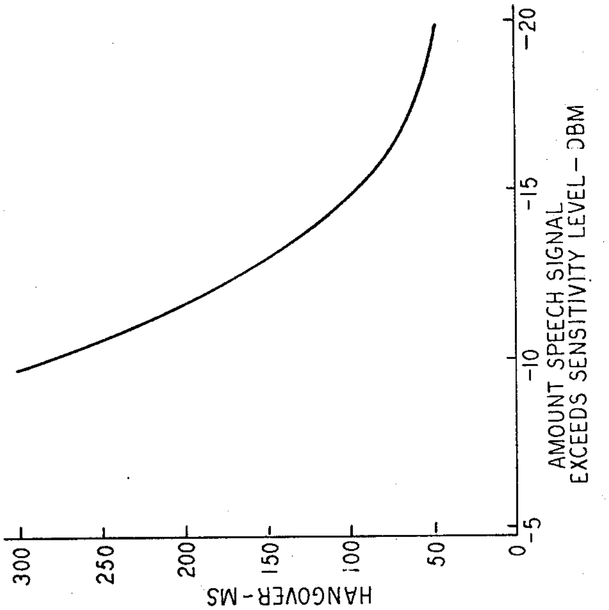
FIG. 16 shows an empirically determined distribution of required hangover as a function of signal amplitude on a line.

Similarly, FIG. 16 shows an empirically determined distribution of the speech detector hangover required for transmission of high quality speech as the amplitude of the speech signals vary. This figure indicates that, as speech amplitude decreases, hangover must be increased if the same quality of transmission is to be maintained.

Applicant's invention utilizes the information obtained from distributions such as those of FIGS. 14, 15, and 16 in detecting speech. This is done by providing the speech detector with the capability of adjusting its operating parameters for various signal amplitudes in a manner approximating the various distributions described above.

Referring to FIG. 1, a plurality of signal source lines 50, such as might be found, for example, in a TASI system, are shown. Each of these lines is introduced into a multiplexing system 51 which operates to connect any one of them to any one of a lesser number of transmission lines 60 when the appropriate control signals are present. One source of such control signals for the multiplexing system is the speech detector system shown in FIG. 1. This system generates the control signals TNC (talker needs connection) and TDNC (talker doesn't need connection).

The signal source lines 50 are also connected to individual per trunk equipment 1 which consists of signal converters 2 through 4. Each signal converter has a variable number of circuits biased to different degrees of sensitivity which detect various levels of signal amplitude. For the purpose of discussion, it is assumed there are five such circuits in each signal converter. A signal on a line is applied to all five of these circuits simultaneously and results in an output signal from each of those circuits whose sensitivity level is exceeded. The outputs of each signal converter are connected to a set of contacts at one of the various positions on a signal level commutator 5. The brush 6 is driven in a counterclockwise direction, at a rate determined by the sampling rate desired, to produce repetitive samples of line signal level at regular intervals. It should be noted that, although the commutator is shown as a mechanical device to facilitate explanation, it will normally be in the form of one of a number of well-known electronic scanners when the desired sampling rate is high.

(1) GENERAL DESCRIPTION OF VARIABLE SENSITIVITY

The purpose of the variable sensitivity control 8 (FIG. 1) is to provide a means for automatically varying the speech detector sensitivity in a manner approximating the distribution shown in FIG. 14. In other words, by changing the sensitivity reference value stored in sensitivity store 9 (FIG. 1) for a line, the signal amplitude required on that line to generate the activity signal A (FIG. 1) is changed. An example would be the case where, due to an increased signal amplitude on a line, the preceding sensitivity reference value for the line is replaced by a new value. More particularly, if the old reference value required the line signal amplitude to be sufficient to generate the amplitude level signal $A_0$ (FIG. 1) before the line activity signal A was produced and the new reference value requires the higher line signal amplitude required to generate the amplitude level signal $A_1$, the speech detector sensitivity has been reduced. After the new reference value is in the sensitivity store 9, signals on the line with an amplitude sufficient to produce an $A_0$ signal, but not an $A_1$ signal, will fail to generate the activity signal A. The logic involved in replacing the old reference value with the new one is based on the distribution in FIG. 14. Consequently, the sensitivity of the speech detector has been reduced as a result of the increased signal amplitude on the line, in a manner approximating the distribution.

Referring to FIG. 1, if the brush 6 is in the position shown, signal level samples of line $L_1$ are collected from signal converter 2 by the brush 6 and introduced into the variable sensitivity control 8. The variable sensitivity control performs two functions. The first is to compare the amplitude level signals $A_0$ through $A_3$ with a sensitivity reference value, stored in a prescribed location of the sensitivity store 9. This comparison is performed to determine if the signal on line $L_1$ is of sufficient amplitude to indicate that the line is active. It should be noted that either speech signals or noise signals of sufficient amplitude can result in an indication that the line is active. At this point, no attempt is made to discriminate between the two. When the signal is of sufficient amplitude, a line activity signal A is generated which is transmitted to the connection requirement status control 10 and the timing unit 14.

The presence of the signal L from converter 2 indicates that the sampled signal on line $L_1$ was of sufficient amplitude to trigger all of the level detecting circuits contained in the signal converter. The system is designed to interpret this condition as indicating that, at the time the line sample was taken, the talker was speaking loud enough to be considered a loud talker. This information is used in the status control 10 to adjust the hangover for line $L_1$ once the line attains a status indicating there is a talker on it.

The second function of the sensitivity control is to convert the amplitude level signals from the sampled signal converter 2 into a new sensitivity reference value based on the distribution in FIG. 14 when the appropriate enabling signals are present. This new reference value then replaces the old reference value in the sensitivity store 9. The new reference value will be the reference value used the next time $L_1$ is sampled. This is accomplished by synchronizing the accessing of locations in the sensitivity store 9 with the scanning rate of the commutator 5 in such a manner that the new reference value will be available for comparison during the next sample of $L_1$.

It should be noted that the sensitivity control 8 has inputs from the status control 10 and timing unit 14. These inputs are used as enable signals for the variable sensitivity feature of the invention described above. Since the variable sensitivity feature is based on the distribution of sensitivity as a function of speech amplitude (FIG. 14), it is desirable to inhibit it until it is established that the signals on a line are the speech signals of a talker. Consequently, the variable sensitivity control remains inoperative until the status of the line, determined by the status control 10, indicates there is a talker on the line. When a line has a talker status, the variable sensitivity feature is enabled and the sensitivity of the speech detector is varied, during the interval the line has a talker status, as a function of the speech signal amplitude.

(2) GENERAL DESCRIPTION OF STATUS CONTROL

The purpose of the status control 10 in FIG. 1 is to assign one of a number of states to each of the source lines 50 as it is repetitively sampled. The state assigned to a line at a given time indicates its connection requirement status at this time. The particular state assigned to a line can vary from sample to sample of the line if the signal activity and amplitude on it varies sufficiently. If the signals on a line are sufficient to generate a line activity signal A (FIG. 1) every time the line is sampled, indicating the line is continuously active, a sequence of states are assigned to the line over a period of time. This sequence culminates in a state that generates the TNC (talker need a connection) signal which is used to connect the source line 50 (FIG. 1) to a transmission line 60 (FIG. 1).

FIG. 4A is a state diagram of the status control circuit 10 in FIG. 1. Referring to FIGS. 1 and 4A together, the sequence of state assignment is as follows: If the line $L_1$ (FIG. 1) is inactive; that is, the signal amplitude on it is insufficient to generate an activity signal A (FIG. 1), its assigned state is the idle (I) state. This state results in the generation of the TDNC (talker does not need a connection) signal by output unit 12 in FIG. 1, keeping the source line $L_1$ from being connected to a transmission line 60.

When the signal amplitude on the source line $L_1$ is sufficient to generate the activity signal A (FIG. 1) the I state (FIG. 4A) is replaced by the operate time (OT) state. This state indicates that, although line $L_1$ (FIG. 1) has become active, it has not been active long enough to indicate the presence of speech on it. For instance, a burst of noise may have caused the activity signal A (FIG. 1) to be generated. Consequently, no TNC signal is generated during the OT state and the source line $L_1$ (FIG. 1) remains disconnected from all the transmission lines 60. The OT state (FIG. 4A) may be considered a transition state.

After the signals on the line $L_1$ have resulted in the activity signal A (FIG. 1) being generated continuously for a preselected interval, the OT state (FIG. 4A) assigned to line $L_1$ (FIG. 1) is replaced by the deferred hangover (DHO) state. This state indicates that the line has been continuously active long enough to indicate the possibility of the presence of speech signals on the line. During the interval the assigned state of the line $L_1$ is DHO, a TNC signal is generated by output unit 12 (FIG. 1) indicating that the source line requires a connection to a transmission line.

However, even in the DHO state (FIG. 4A) there is a possibility that the line $L_1$ (FIG. 1) activity is due to noise. Therefore, if the signal amplitude on the line becomes insufficient to generate the activity signal A during the DHO state, a shorter than normal hangover is provided. This hangover is represented by the minimum hangover (MHO) state in FIG. 4A. The shorter hangover is provided to minimize the length of time a source line, such as $L_1$ (FIG. 1), will be connected to a transmission line if the signal activity on it is due to noise. After the line $L_1$ has been in the MHO (FIG. 4A) state a preselected interval, the MHO state is replaced by the I state, resulting in a TDNC signal being generated which disconnects the line. However, if, during the MHO state, the activity signal A is generated before the preselected interval expires, the state assigned to line $L_1$ becomes the DHO state again indicating line $L_1$ is active.

As in the case of the OT state, after signals on the source line have resulted in the continuous generation of activity signal A (FIG. 1) for a preselected interval, the DHO state (FIG. 4A) is replaced by one of the two states referred to as talker states. If the signals on the source line are of sufficient amplitude to generate the amplitude level signal L (FIG. 1), the DHO state is replaced by the loud talker (LT) state (FIG. 4A) indicating that the signals on the line are high enough to consider them the speech signals of a loud talker. On the other hand, if the signals on the line are not of sufficient amplitude to generate the signal L, they are considered the speech signals of a weak talker and the DHO state (FIG. 4A) is replaced by the weak talker (WT) state.

During either the LT or WT state, the TNC signal continues to be generated keeping the source line $L_1$ (FIG. 1) connected to a transmission line 60. If the signal amplitude on the source line drops so that the activity signal A (FIG. 1) is no longer generated during either of the states LT or WT, the existing state is replaced by its respective hangover state, loud talker hangover $H_1$ or weak talker hangover $H_2$ (FIG. 4A).

The $H_1$ and $H_2$ states both provide full hangover for the inactive line $L_1$ (FIG. 1), keeping it connected to a transmission line. However, the length of full hangover differs depending on whether it is $H_1$ or $H_2$ hangover. As indicated by the distribution in FIG. 16, the same quality speech transmission can be obtained for a loud talker using less hangover than would be required for a weak talker. Consequently, if a loud talker on line $L_1$ becomes inactive, it is desirable to provide him with a shorter hangover than would be provided for a weak talker. This minimizes the time line $L_1$ is connected to a transmission line while the loud talker is not speaking. As a result of the above, the duration of hangover provided by the $H_1$ state is shorter than that provided by $H_2$.

The hangover state assigned to line $L_1$ (FIG. 1) continues to exist until either the signal amplitude on the line becomes sufficient to generate the activity signal A again or until the preselected interval for the particular hangover state involved expires. If the activity signal A (FIG. 1) is generated before the hangover interval expires, and continues to be generated for a given period, the hangover state is replaced by the appropriate talker state, LT or WT. On the other hand, if the preselected interval of the hangover state expires, the hangover state is replaced by the idle state (FIG. 4A). The idle state being assigned to the line $L_1$ (FIG. 1) indicates that the line has been inactive long enough to consider it idle. When the hangover state is replaced by the idle state, the TNC signal (FIG. 1) ceases to be generated and the TDNC signal is generated. The generation of the TDNC signal results in line $L_1$ (FIG. 1) being disconnected from its transmission line.

The above discussion considered only the line $L_1$ shown in FIG. 1. However, the sequence of state assignment is generally the same for each of the lines $L_1$ through $L_n$.

More particularly, referring to FIG. 1, the connection requirement status control 10 compares the signals A and L with the past connection requirement status of line $L_1$, stored in a prescribed location of the status store 11, and timing signals generated by timing unit 14. This is done to statistically determine the present connection requirement status of line $L_1$. The present connection requirement status replaces the old status in store 11 which, like the sensitivity store, is also synchronized with the scanning rate of the commutator 5. The new status will be used as a reference the next time line $L_1$ is sampled. The present status is also transmitted to the timing unit 14, for control purposes, and to the output unit 12 where it is used to generate a TNC or a TDNC signal, accordingly.

(3) GENERAL DESCRIPTION OF TIMING

The timing unit 14 is controlled by the activity signal A, the present connection requirement status signal and enable pulses generated by the enable pulse generator 13. The signal A determines whether a stored timing code for the line $L_1$ will be incremented or be decremented while the present status signals and the enable pulses determine the frequency at which the code will be altered. As the stored timing code is altered it is also compared with preselected fixed reference codes and any time the stored code equals any one of the reference codes a timing signal representing this particular compare is generated.

Figure 11:
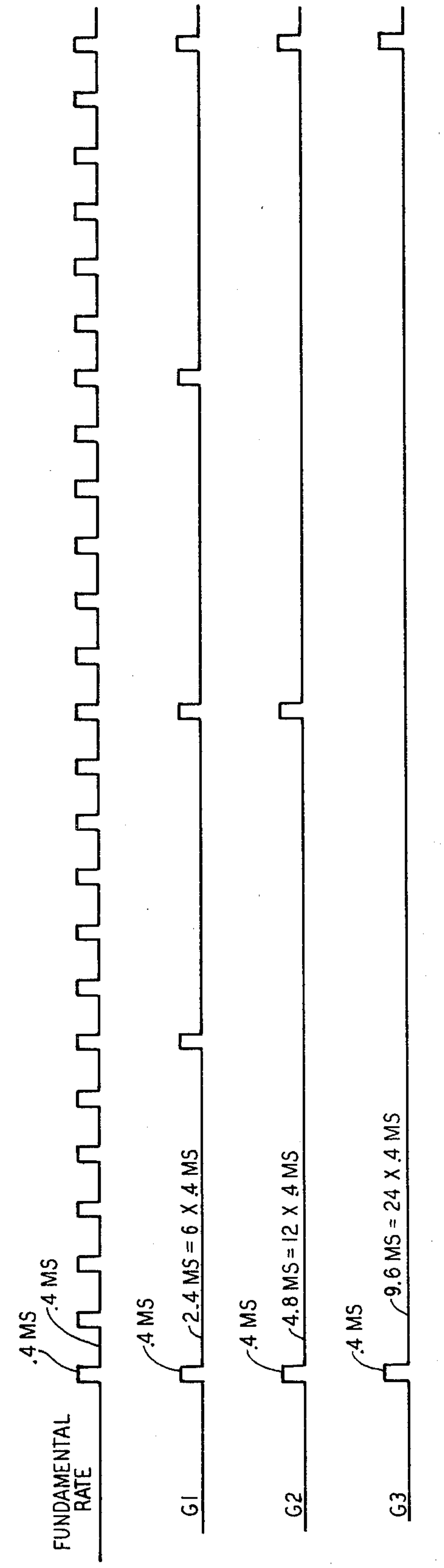
FIG. 11 is a graphical representation of the granularity pulses which is useful in the explanation of the operation of FIG. 4A.

The enable pulse generator 13 is a frequency dividing means with a fundamental reference frequency equal to the sampling rate of the commutator. This generator has a plurality of pulse train outputs of different frequencies. These various pulse trains are used selectively to enable the timing unit at intervals equal to or some submultiple of the commutator scanning rate. Examples of these pulses are shown in FIG. 11.

After the outputs of converter 2 have been sampled and the foregoing operations have been performed, the brush moves to the commutator position where the signal level samples for line $L_2$ are available as outputs from converter 3. Due to the synchronous operation of the various storage means, the sensitivity and connection requirement status reference values and the timing code for line $L_2$ are available for use in determining its present connection requirement status at this time. This occurs repetitively as the brush rotates, making contact with the various commutator positions at regular intervals.

In view of the above discussion, the overall general operation of applicant's speech detector may be summed up as follows: When the signal on a source line initially attains sufficient amplitude to cause the amplitude level signal $A_0$ (FIG. 1) to be generated, the sensitivity control 8 will, in turn, generate the activity signal A. If the signal amplitude on the line remains high enough to continuously generate activity signal A, the status control 10 assigns a sequence of states, including the DHO state (FIG. 4A), to the line until one of the talker states LT or WT (FIG. 4A) is attained. During the DHO, LT and WT states a TNC signal is generated which results in the source line being connected to a transmission line. When the state assigned to the source line is LT or WT, the variable sensitivity feature of the sensitivity control 8 (FIG. 1) is enabled. The purpose of this feature is to alter the speech detector sensitivity, as a function of the signal amplitude on the line. That is, as the signal amplitude on the source line increases, the sensitivity decreases, requiring the signal on the line to be sufficient to generate $A_1$, $A_2$ or $A_3$ before the activity signal A will be generated. This is done in a manner approximating the distribution shown in FIG. 14.

When, during the LT or WT states (FIG. 4A), the signal amplitude on the line becomes insufficient to generate the activity signal A (FIG. 1), the existing state is replaced by the appropriate hangover state $H_1$ or $H_2$ (FIG. 4A). During either of these hangover states the source line remains connected to the transmission line. However, the variable sensitivity becomes inoperative upon entering either of the connection requirement hangover states, remaining in the sensititvity state it was in at the termination of the preceding WT or LT state.

The two hangover states each provide full hangover for the source line when it becomes inactive, but the duration of the full hangover varies, depending on which state is assigned to the line. The $H_1$ state provides hangover for the source line if it had a loud talker on it before becoming inactive. Similarly, $H_2$ provides hangover if the line had a weak talker on it before it became inactive. Consequently, in accordance with the distribution in FIG. 16, the $H_1$ hangover, for loud talkers, is of shorter duration than the $H_2$ hangover for weak talkers.

After the line has been inactive long enough for the existing hangover state to expire, the hangover state is replaced by the idle state, indicating that the line no longer needs a connection. At this point, the source line is disconnected from the transmission line.

Additionally, the sensitivity control remains in the same sensitivity state it was in when the preceding WT or LT state expired and a hangover state was entered. In other words, if, upon the expiration of the WT or LT state, the signals on a line had to be of sufficient amplitude to produce the signal $A_2$ (FIG. 3) before the signal A (FIG. 1) was generated, they will also have to have this amplitude before the signal A will be generated during the subsequent hangover or Idle state for that line. When the source line becomes active again and the signal amplitude becomes sufficient to generate the signal A, the above process is repeated.

The process for each of the source lines 50 (FIG. 1) is generally the same as above. The sensitivity of the speech detector to signals on each line is distinct for each line. It is a function of the past and present signal amplitude on the line being sampled. Similarly, the state assignment process is independent for each line and is dependent on the past and present activity of the line being sampled.

DETAILED DISCUSSION OF STATUS CONTROL AND TIMING

Figures 2A, 17:
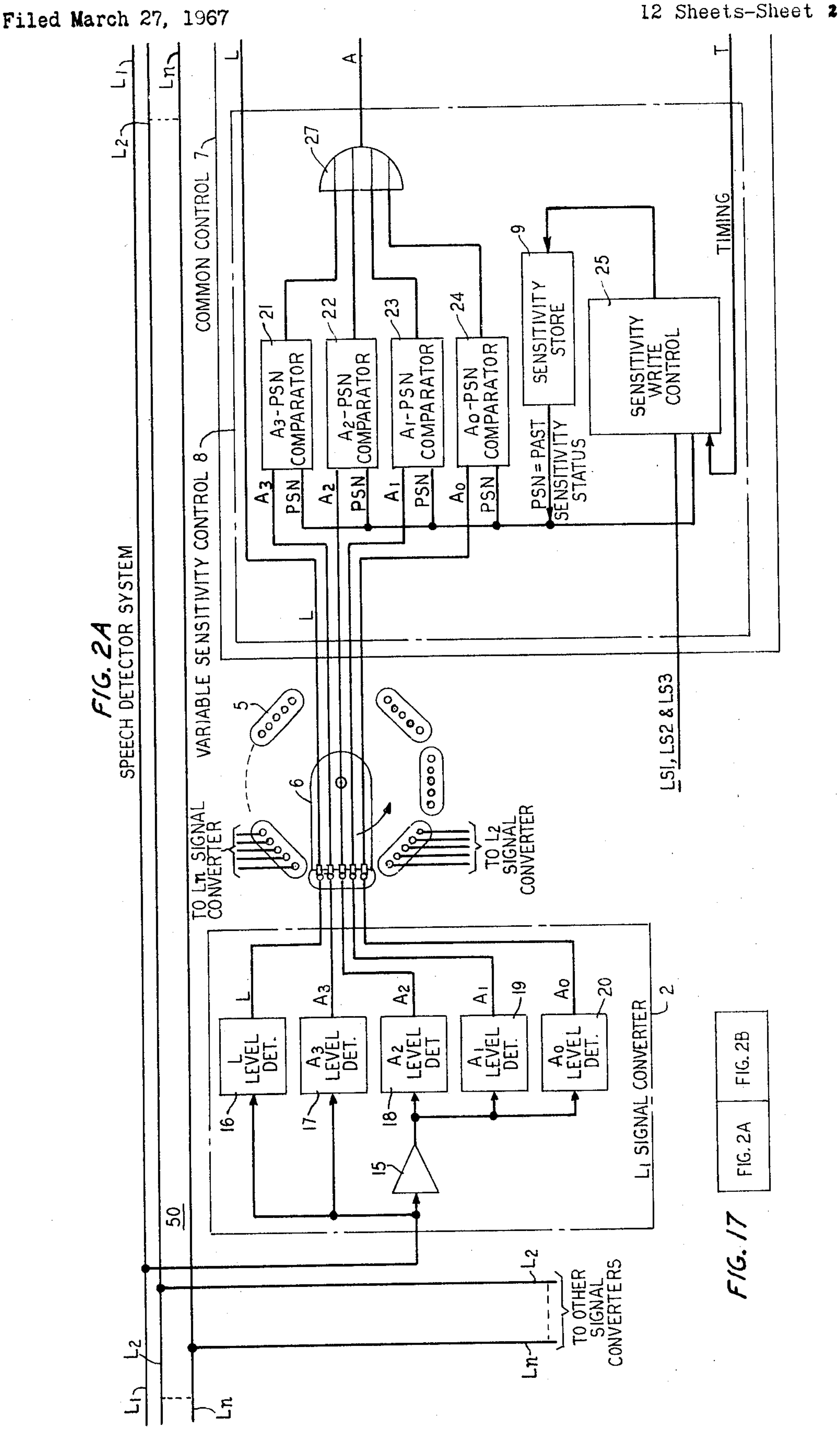
FIGS. 2A and 2B show a more detailed block diagram of the speech detector system in accordance with the present invention.
FIG. 17 shows the relationship between FIG. 2A and FIG. 2B.
Figure 2B:
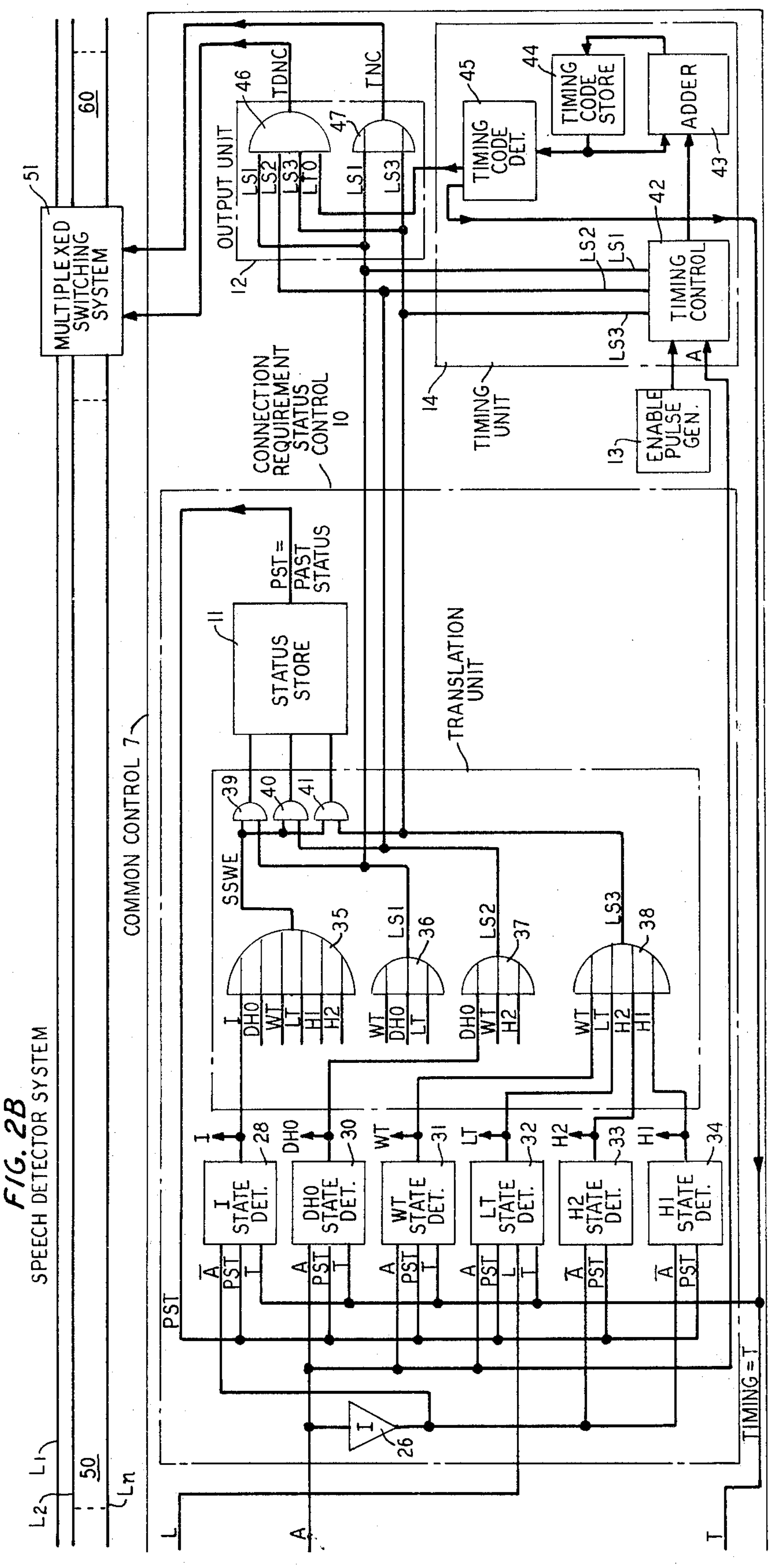

Referring to FIGS. 2A and 2B the operation of the speech detector can be most clearly explained by considering what occurs when one line becomes active and obtains a connection signal and then becomes inactive and obtains a disconnect signal. For purposes of explanation, assume that line $L_1$, which has been idle, becomes active and remains so until a connection signal TNC is obtained. Since line $L_1$ is active, there is a signal applied to the $L_1$ signal converter 2. This signal is applied directly to the least sensitive level detectors 16 and 17 simultaneously. The signal is also applied to level detectors 18 through 20, through amplifier 15 which increases the linear range of the input signal amplitude for purposes of multilevel detection. Each of the level detectors 16 through 20 are biased to different levels of sensitivity with the $A_0$ detector 20 being the most sensitive and the L detector 16 being the least sensitive. It will be assumed that, during the first sample of line $L_1$ after it has become active, when brush 6 is in the position shown, the amplitude of the analog speech signal is sufficient to trigger only the $A_0$ detector 20. When this occurs, the amplitude level signal $A_0$ is generated by the $A_0$ detector 20, indicating that it has been triggered.

Figure 12:
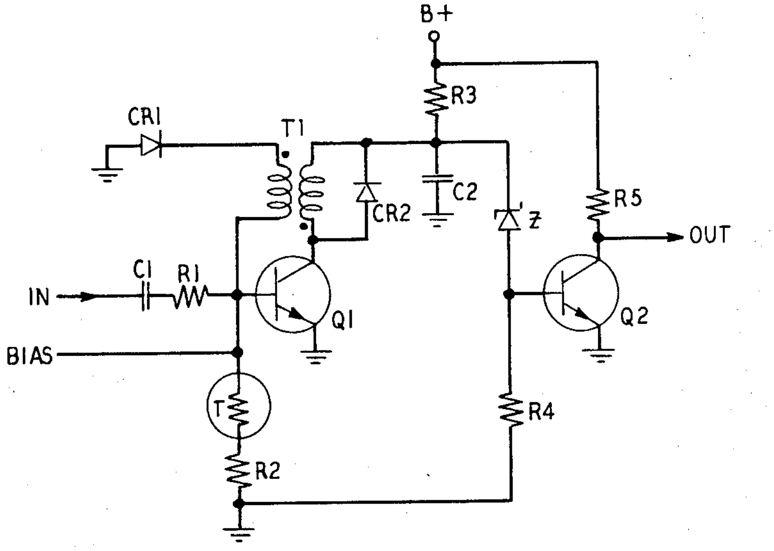
FIG. 12 shows a circuit for detecting one level of a signal on one of the signal source lines.

A circuit such as that shown in FIG. 12 can be used as a level detector. This circuit consists of a blocking oscillator which drives an output transistor. The blocking oscillator transistor $Q_1$, which is normally biased nonconducting, begins to conduct when an input signal is applied through $C_1$ and $R_1$ forward-biases its base-emitter junction. During conduction, transistor $Q_1$ provides a low impedance discharge path for capacitor $C_2$, discharging $C_2$ below the breakdown voltage of the Zener diode Z and cutting transistor $Q_2$ off. Transistor $Q_2$ will remain cut off until $C_2$ has recharged, through $R_3$, to the breakdown voltage of the Zener diode Z. The $R_3$–$C_2$ time constant is chosen to bridge one cycle of the lowest frequency to be considered in speech detection. For instance, where the lowest frequency considered is 500 cycles per second, the time constant of 2 milliseconds will bridge one cycle for half-wave rectification and one millisecond would be sufficient where full wave rectification was being used. This results in converting the analog speech signals on a line to discrete valued signals taken from the collector of transistor $Q_2$. The thermistor T, in the base circuit of transistor $Q_1$, is provided to compensate for variations in the transistor operation resulting from temperature fluctuations. Detection of the various line signal levels is obtained by providing one of these circuits for each level detector 16 through 20 (in FIG. 2A) and decreasing the biasing on each circuit, respectively.

Returning to FIG. 2A, since the signal on line $L_1$ is sufficient to trigger only the $A_0$ detector 20, a positive going pulse is available only at the output of the $A_0$ detector 20 and the outputs of detectors 16 through 19 are zero. These five amplitude level signals $A_0$ through $A_3$ and L are collected by the brush 6 and introduced into the sensitivity control 8 where it is determined whether or not the sampled outputs of the level detectors 16 through 20 indicate a signal of sufficient amplitude on line $L_1$ to warrant action by the speech detector. Here again, it should be noted that either noise or speech signals of sufficient amplitude result in the sensitivity control indicating that a line is active, and action by the speech detector is required. Speech detector action initiated by noise is compensated for in the status control 10.

Considering the output of the level detectors 16 through 20 as binary outputs, the output of the $A_0$ level detector 20 is a "1" and the outputs of the level detectors 16 through 19 are "0." Consequently, the amplitude level signal $A_0$ input to comparator 24 is a "1" and the amplitude level signal input to each of the other comparators 21 through 23 is a "0." The other inputs for each of the comparators are the signals stored in the sensitivity store 9.

For purposes of illustration, the sensitivity store 9 will be considered to be a storage means providing two bits of storage in a prescribed location for each line to be sampled. An example of such a storage means is a pair of recirculating acoustical delay lines each with a delay equal to the interval at which a line is sampled. The 2-bit store is capable of storing four ($2^2$) distinct reference values; one of these values is used as a reference signal for each of the four comparators 21 through 24.

FIG. 3 is a state diagram of each of these four digital reference values with its associated amplitude level signal. For instance, when "00" is present on line PSN (FIG. 2A) and the amplitude level signal $A_0$ has been generated, the comparator 24 is enabled and generates the activity signal A. Additionally, FIG. 3 shows the steps involved in the operation of the variable sensitivity feature of the sensitivity control 8.

Since line $L_1$ has been inactive, the reference value in the storage location prescribed for line $L_1$ will represent the most sensitive state of the sensitivity control. The most sensitive state of the sensitivity control is represented by the reference value "00" (FIG. 3). Returning to FIG. 2A, at the time the sampled inputs from the level detectors, represented by amplitude level signal $A_0$ through $A_3$, are present as inputs for the comparators 21 through 24, the "00" reference value for $L_1$ is also available from the sensitivity store. These two bits are applied to all the comparators simultaneously over a pair of lines represented by PSN. The circuitry for each of the comparators is such that they will generate an output signal only when the amplitude level signal input from their respective signal level detectors is a "1" and the 2-bit reference value, applied over PSN, is the reference value necessary to enable the comparator. Since only one reference value can be stored in a sensitivity store location at any one time, only one of the comparators will generate a signal for any input from the level detectors. For the present case, the amplitude level signal $A_0$ input to comparator 24 is a "1" indicating the signal amplitude on line $L_1$ is sufficient to generate the signal $A_0$. Additionally, the reference value "00" required to enable comparator 24 is available in the sensitivity store and present on the line PSN. Therefore, comparator 24 generates the line activity signal A. This signal indicates that there is a signal on line $L_1$ with sufficient amplitude to warrant speech detector action. It can be generated by the sensitivity control 8 as a result of either noise or speech being present on line $L_1$. Circuitry in the form of NAND logic is shown for the sensitivity control in FIG. 10.

To this point, it has been shown how the appearance of a signal, of sufficient amplitude, on a previously inactive line results in the initial generation of the activity signal A (FIG. 2A). Activity signal A initiates the status control 10 (FIG. 2B) action and timing unit 14 activity, resulting in the assignment of various connection requirement states to line $L_1$. Since the initial states assigned to line $L_1$ are not talker states, the variable sensitivity feature of the sensitivity control is not operative at this time. Consequently, the sensitivity of the speech detector remains at the same level as it was at when the last talker state assigned to line $L_1$ expired. The operation of the variable sensitivity feature will be explained later after it has been shown how the status control 10 and timing control 14 assign various connection requirement states to line $L_1$ when the speech detector sensitivity remains fixed. The explanation is handled in this manner to clarify the discussion of the operation of the status control 10 and timing unit 14.

The line activity signal A is connected to state detectors 30, 31, and 32 (FIG. 2B) in the status control 10. It is also connected to inverter 26 (FIG. 2B) which inverts it and applies it to the state detectors 28, 33, and 34.

To facilitate explanation, the status store 11 in the status control is assumed to be a storage means capable of providing three bits of storage in a prescribed location for each line to be sampled. The status store, like the sensitivity store 9, could also be recirculating acoustical delay lines synchronized with the sampling rate so that the prescribed location for a given line is available at the time the line is sampled.

Figure 5:
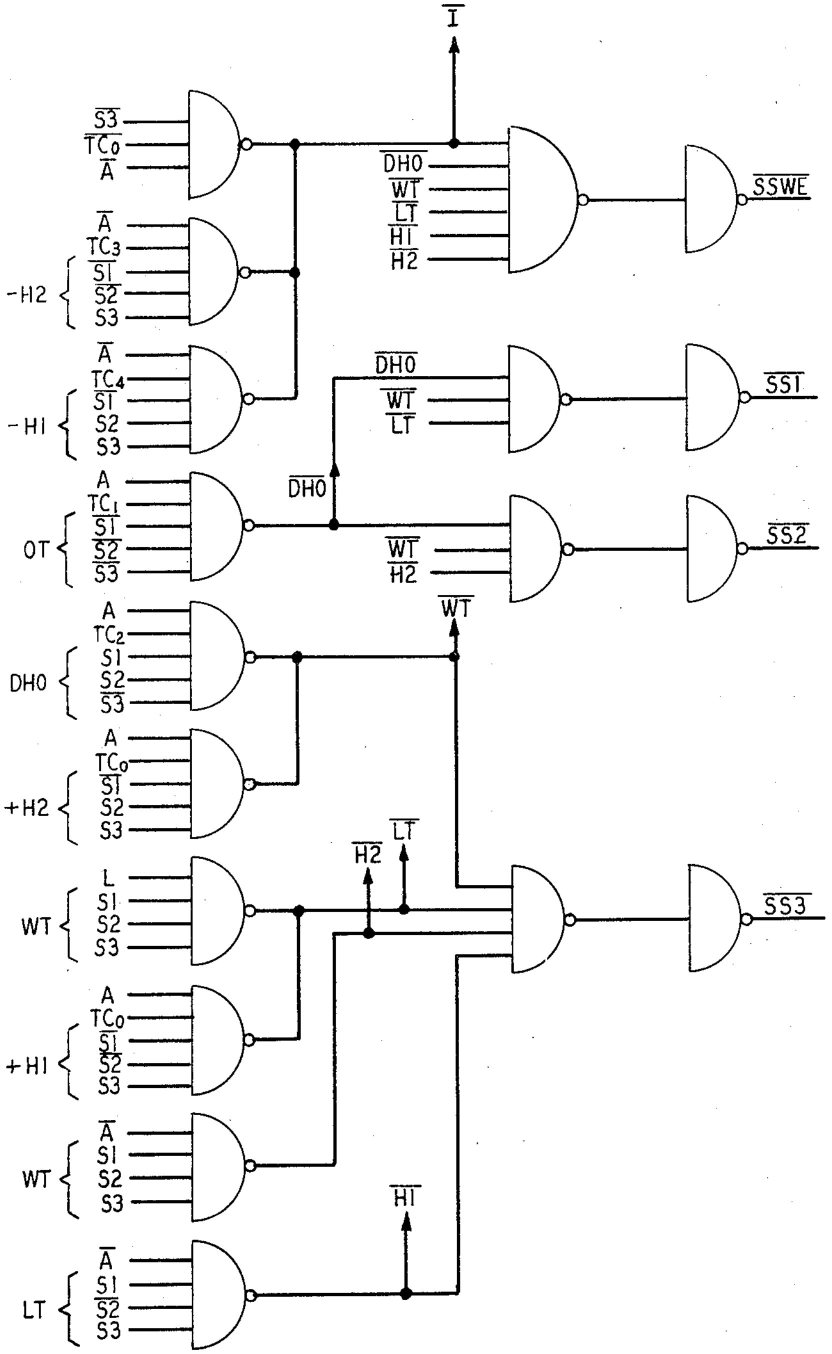
FIG. 5 shows NAND logic circuitry for the connection requirement status control.
Figure 6:
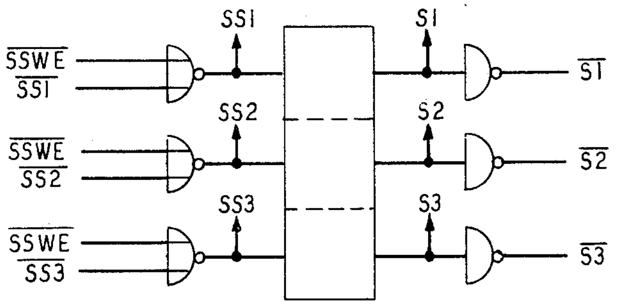
FIG. 6 shows NAND logic circuitry for the status store.

FIG. 4A shows the various digital reference values of the status control and a state diagram of its operation. Since line $L_1$ (FIG. 2A) has been inactive, the location allocated for storing its connection requirement status reference value contains the code representing the idle (I) state "000." This reference value is applied to gate 46 (FIG. 2B) on lines LS1 through LS3 and results in the generation of the TDNC signal when line $L_1$ is sampled. Additionally, the line $L_1$ status reference value A or $\overline{A}$ and, in some cases, selected timing signal outputs, are applied to all of the state detectors 28 through 34 in FIG. 2B. None of the state detectors will respond to the signals present at this time and the status reference value for line $L_1$ remains "000." Logic implementing the status control of FIG. 4A is shown in FIG. 5. The SS1 through SS3 signals in FIG. 5 represent the 3-bit state codes shown in FIG. 4A.

Although the signals applied to the state detectors do not alter the stored status reference value of line $L_1$ during this sample of line $L_1$, the simultaneous application of A to the timing control 42 (FIG. 2B) does result in the alteration of the line $L_1$ stored timing code. This timing code is stored in the timing code store 44 (FIG. 2B) which, like both the sensitivity store and the status store, provides a storage location for each line being sampled. This storage means is also synchronized with the sampling rate.

Figure 7:
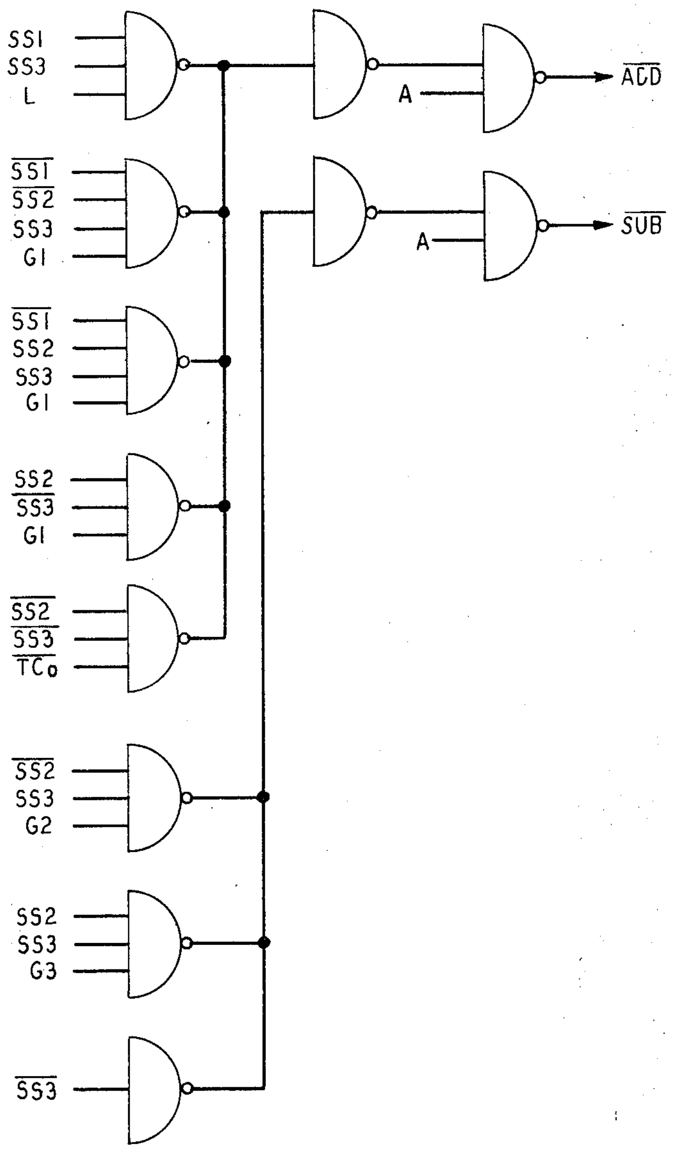
FIG. 7 shows NAND logic for the timing control.
Figure 8:
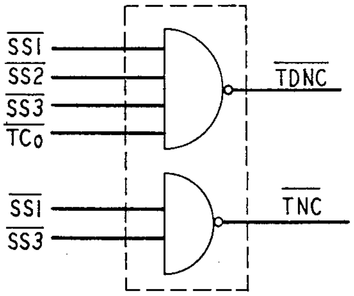
FIG. 8 shows NAND logic circuitry for the output unit.

The presence or absence of A, indicating whether or not there is signal activity on line $L_1$, is used in the timing control to determine the arithmetic operations to be performed on the stored timing code by the adder 43. This signal is combined in the timing control with the present status information on lines LS1 through LS3 and pulse trains from the pulse generator 13 to determine if an arithmetic operation is to occur for this sample. The effect of activity signal A on the arithmetic operations of the timing unit is indicated in FIG. 4A by using arithmetic signs as prefixes of the acronyms used for the various states. The presence of A indicates that if an arithmetic operation is to occur, the stored timing code for $L_1$ is to be incremented by "1." The "000" on the lines LS1 through LS3 is combined with the pulse train from the enable pulse generator 13 having a recurrence rate equal to the sampling rate. This indicates that an arithmetic operation is to occur for every sample of line $L_1$ as long as the above condition exists. Consequently, the timing control generates a signal which enables the adder 43. Circuitry for the timing control in the form of NAND logic is shown in FIG. 7.

Simultaneously with the enabling of the adder, the stored timing code for line $L_1$ becomes available to the adder 43 (FIG. 2B). Since $L_1$ has been inactive, its stored timing code is the zero time timing code $TC_0$ which, for purposes of illustration, may be considered a 5-bit code equal to "00000." The adder increments this code by "1" and the incremented code in then compared with fixed preselected reference codes in the timing code detector 45. This detector, which is an AND gate matrix, generates a distinct timing compare signal each time the stored timing code equals a preselected reference code. Examples of intervals represented by these reference codes, which are empirically determined, are shown in FIG. 4B. After the $L_1$ timing code has been incremented by "1" it is no longer equal to $TC_0$ or any other reference code and there is no output signal from the timing code detector 45. Consequently, the line $LT_0$ (FIG. 2B), over which the $TC_0$ signal is transmitted, will have a "0" on it since $TC_0$ is "0."

The "000" status on lines LS1 and through LS3 and the timing detector output are introduced into the output unit 12 (FIG. 2B). Since the signal on timing code line $LT_0$ is now a "0," gate 46 will not generate the TDNC signal. During the idle state I (FIG. 4A) neither the signal TDNC nor TNC is operated. The reasoning behind this is that even though line $L_1$ has become active on this sample, it has not been active long enough to warrant generating the connection signal TNC which results in line $L_1$ being connected to a transmission line. The activity of line $L_1$ could be due to noise rather than speech. The speech detector is now in the operate time state OT, shown in FIG. 4A.

If line $L_1$ is scanned repetitively and the line activity signal A continues to be generated every sample, the above operations will reoccur. The stored timing code for line $L_1$ will be incremented until it reaches a value equal to the selected reference timing code $TC_1$. When this occurs, the past status reference value will be "000" and a timing signal indicating that the stored timing code for line $L_1$ is equal to the reference code $TC_1$ will be present. These signals are applied to the detectors 28 and 30 through 34 in FIG. 2B. Given these inputs, the deferred hangover state (DHO) detector 30 will generate an output of "1." Referring to FIG. 4A, $OT \cdot A \cdot TC_1$ are the conditions necessary to change from the OT state to the DHO state. The "1" output of the DHO detector is connected to the OR gates 35, 36, and 37. The "1" applied to gate 35 generates an enable signal for AND gates 39 through 41 which allows the "1's" from gates 36 and 37 and the "0" from gate 38 to replace the "000" written in the status store with "110." when this occurs the connection requirement status assigned to line $L_1$ has been changed from OT to DHO.

For the first time, during the DHO state (FIG. 4A) the TNC signal (talker needs a connection) is generated by the output unit 12 (FIG. 2B). It will be noted, upon referring to FIG. 4A, that the TNC signal is generated during all of the following states: DHO, WT, LT, $H_1$, and $H_2$. Consequently, anytime the connection requirement state assigned to line $L_1$ is one of these states, the line is connected to one of the transmission lines 60 (FIG. 2B).

The timing control unit 42 (FIG. 2B) will behave differently now that the connection requirement status of line $L_1$ has changed. The presence of A indicates that if the stored timing code for line $L_1$ is altered, it is to be incremented. However, the "110" on lines LS1 through LS3, representing the DHO state, is combined with a pulse train from the pulse generator 13 which has a repetition rate of one-sixth that of the communtator sampling rate. Consequently, the timing control will generate a control signal only every sixth sample of the line $L_1$. This results in the stored timing code for line $L_1$ being altered only every sixth sample, as long as the DHO state exists. This is done to allow the use of the same size storage means for longer timing intervals, where accuracy requirements are not as great, as for short timing intervals.

Figure 9:
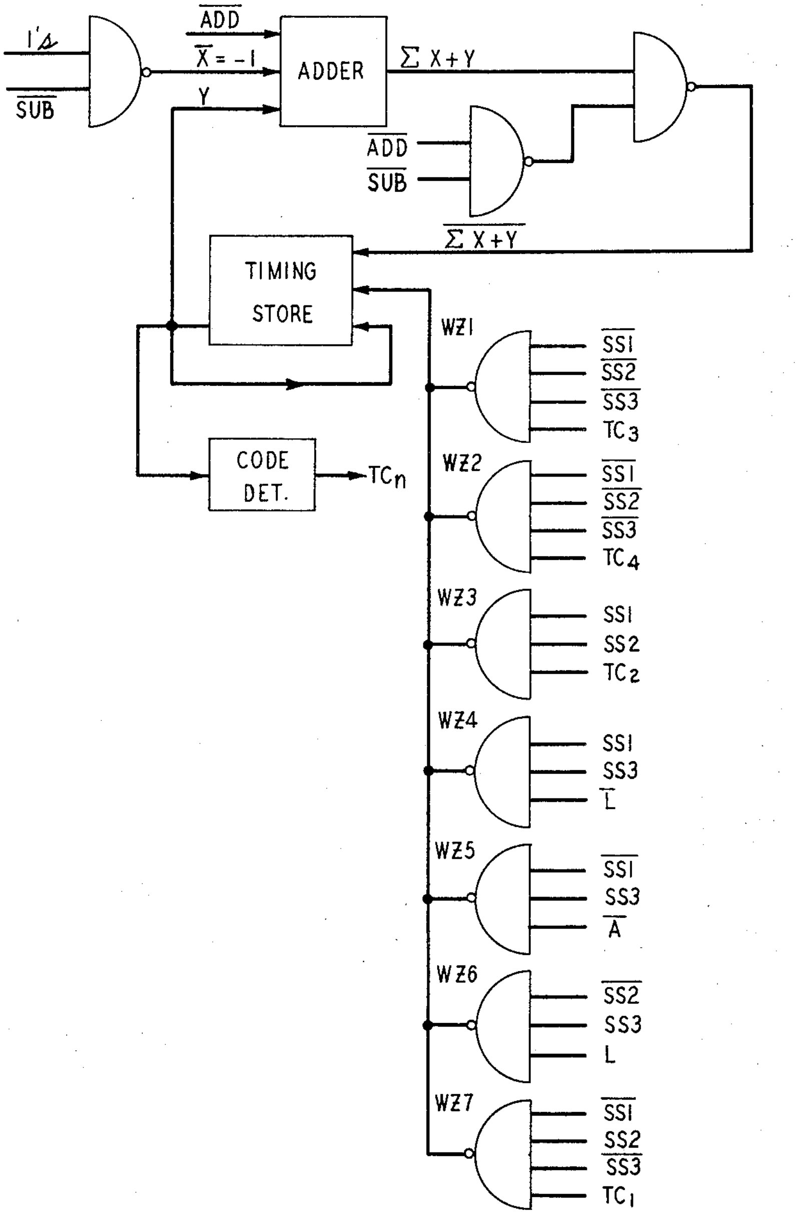
FIG. 9 shows NAND logic circuitry for the adder.

As samples of line $L_1$ continuously generate the activity signal A, the stored timing code is incremented every sixth time the line is sampled until it equals the reference timing code $TC_2$ (FIG. 4A). When this occurs, the signal "110," representing the DHO state, the timing signal for the $TC_2$ compare, and the activity signal A enable the weak talker state (WT) detector 31 (FIG. 2B) which generates a "1" output. This signal is an input to OR gates 35 through 38 whose outputs are applied to AND gates 39 through 40 to write "111" in the status store. Furthermore, when the occurrence of $DHO \cdot TC_2$ results in "111" being present on the lines LS1 through LS3, the timing code for line $L_1$ becomes $TC_0$ again. The logic for this is shown in FIG. 9. When the LS1 and LS2 inputs to gate $WZ_3$ (FIG. 9) are "1" and $TC_2$ exists, "00000" is written in the line $L_1$ timing code storage slot.

As long as the activity signal A is generated every time line $L_1$ is sampled, the connection requirement status for it will remain WT. There is no timing involved in this state and the timing code slot is used in conjunction with the variable sensitivity which will be explained later. However, if, during a sample of line $L_1$, the signal level drops below the necessary sensitivity level to generate the activity signal A, there will be no output from the WT detector 31. Instead, the existence of the condition $WT \cdot \bar{A}$ (FIG. 4A) enables the hangover $H_2$ detector 33 (FIG. 2B) which generates a "1" output. This results in the WT status "111" in the status store being replaced by the "011" on lines LS1 through LS3 which represents the weak talker hangover state $-H_2$ in FIG. 4A. The condition $WT \cdot \bar{A}$ also results in $TC_0$ being written in the line $L_1$ timing code slot. Logic for this is shown in FIG. 9. While the $-H_2$ state exists, the $TC_0$ timing code, stored in the timing code storage slot for line $L_1$ during $WT \cdot \bar{A}$, will be decremented since the signal A is not present. During the $-H_2$ state, the timing control 42 can generate a signal only when pulses from the pulse generator 13, having a pulse recurrent frequency equal to one twenty-fourth that of the sampling rate, are present. Consequently, the rate at which the timing code is decremented is every twenty-fourth sample in line $L_1$. If the $-H_2$ state continues to exist until the stored timing code for line $L_1$ is decremented to the point that it equals the reference code $TC_3$, the condition $-H_2 \cdot TC_3$ (FIG. 4A) exists. This condition results in a "1" being generated by the idle state (I) detector 27 (FIG. 2B) which results in the AND gates 39 through 41 being enabled. Since none of the other detectors 28 through 34 are enabled, the signal outputs on lines LS1 through LS3 is "000." These zeros replace the "011" in the line $L_1$ location of the status store. Additionally, the existence of $(000) \cdot TC_3$ causes the timing control to replace the $TC_3$ stored timing code for line $L_1$ with all "0's" which is the $TC_0$ timing code. The logic for this is shown in FIG. 9. Gate WZ1 (FIG. 9) is enabled by the existence of the "000" state in conjunction with the $TC_3$ signal causing $TC_0$ (00000) to be written into the timing store. When this occurs the condition $(000) \cdot TC_0$ (FIG. 4A) is true and line $L_1$ is back in the idle state. Additionally, the zero outputs on lines LS1 through LS3 and the $TC_0$ timing compare signal disable gate 47 of the output unit 12 (FIG. 2B) cutting off the TNC signal, and enable gate 46 which generates a TDNC signal. This permits the disconnection of line $L_1$ from its transmission line 60.

If the activity signal A is generated before the timing code for line $L_1$ has been decremented to a value equal to $TC_3$, the line $L_1$ status becomes the $+H_2$ state (FIG. 4A). In this state the timing control begins incrementing the decremented stored timing code for line $L_1$. This occurs every sixth sample of line $L_1$, as was the case during the DHO state. When the stored timing code has been incremented back to the point where it again equals $TC_0$, the "011" in the status store and the timing signal for the $TC_0$ compare produce the condition $+H_2 \cdot TC_0$ (FIG. 4A). This results in a "1" output from the WT detector 31. Consequently, the "011" in the status store is replaced by "111" which indicates that the speech detector is again back in the weak talker state.

Considering the case where the signal amplitude on line $L_1$ (FIG. 2A) is sufficient to trigger all the level detectors 16 through 20 while the speech detector status is WT; this results in amplitude level signals $A_0$ through $A_3$ and L (FIG. 2A) being generated. The presence of the signal L is used in the status control 10 to indicate that the talker on line $L_1$ is speaking loud enough to be considered a loud talker. When this occurs the "111" in the status store 11, the activity signal A, and the loud talker signal L produce the condition $WT \cdot A \cdot L$ (FIG. 4A). This enables the loud talker (LT) detector 32 (FIG. 2B). The enabling of the LT detector results in "1" outputs from the OR gates 35, 36, and 38. The AND gates 39 through 41 respond accordingly, writing the "101" present on lines LS1 through LS3, which represents the LT status (FIG. 4A) into the status store. Here, as in the WT state, there is no timing involved. The existence of $LT \cdot L$ enables gate $WZ_6$ (FIG. 9), causing $TC_0$ to be written into the timing code storage slot for line $L_1$. Here, as in the WT state, the timing code slot for line $L_1$ is used in conjunction with the variable sensitivity as long as the LT state exists. This state continues to exist as long as an activity signal A is generated for each sample of $L_1$. If the signal A is not generated, the condition $LT \cdot \bar{A}$ exists (FIG. 4) which produces the $-H_1$ state. This results in the loud talker ($H_1$) detector 34 generating a signal which results in "001" being present on lines LS1 through LS3. The existence of $(001) \cdot \bar{A}$ results in the $TC_0$ being written into the timing code slot for line $L_1$. The operation here is the same as for that of the $-H_2$ state, except that during the $-H_1$ state the timing code for line $L_1$ is decremented every twelfth time line $L_1$ is sampled until the timing code equals $TC_4$. This gives a shorter hangover for loud talkers than for weak talkers. When $-H_1 \cdot TC_4$ (FIG. 4) occurs, the I state detector 28 (FIG. 2B) generates a "1," enabling AND gates 39 through 41. The "000" output of OR gates 36 through 38, present on lines SS1 through SS3, is at this time written into the status store. Additionally, the existence of $(000) \cdot TC_4$ results in the $TC_0$ timing code replacing the $TC_4$ timing code in the timing code store (FIG. 9). Consequently, the condition $(000) \cdot TC_0$ (FIG. 4A) exists and the connection requirement status of line $L_1$ is again the idle status I.

On the other hand, if the signal A (FIG. 2B) is generated before the $TC_4$ (FIG. 4A) compare signal occurs during the $-H_1$ state, the condition $-H_1 \cdot A$ (FIG. 4A) produces the $+H_1$ state. During this state, the timing control 42 can be enabled only when pulses from pulse generator 13 having a pulse recurrent frequency equal to one sixth the sampling rate, are present. The result is that the stored timing code for line $L_1$ is incremented every sixth sample of line $L_1$ as A continues to be generated, until it equals $TC_0$. The existence of the $+H_1 \cdot TC_0$ (FIG. 4A) condition enables the LT detector 32 (FIG. 2B) which results in the "001" in the status store being replaced by the "101" present on lines SS1 through SS3. This indicates that the current connection requirement state assigned line $L_1$ is again the LT state (FIG. 4A).

In discussing the OT and DHO states (FIG. 4A) nothing was mentioned about the case where the activity signal A (FIG. 2A) was not generated by the sensitivity control 8. The speech detector operation for this case is very similar to that for the above cases. Referring to FIGS. 2B and 4A, if the status store 11 (FIG. 2B) contains the OT code "000" (FIG. 4A), the timing unit decrements the stored timing code for line $L_1$ every time line $L_1$ is sampled and A is not generated. If this timing code is decremented to the point where it equals $TC_0$, the timing signal for the $TC_0$ compare is present and this, along with the "000" in the status store 11, indicates that the present status of $L_1$ has returned to the idle state as shown in FIG. 4A. As was noted earlier, output unit 12 generates a TDNC signal only for the I state. Consequently, gate 46 (FIG. 2B) remains enabled, keeping line $L_1$ disconnected. However, if the signal A is generated before $TC_0$ is reached, the OT state continues to exist and the timing code for line $L_1$ is incremented toward $TC_1$ again.

Similarly, if, during the DHO state $(110) \cdot A$ (FIG. 4A) the activity signal A is not generated, the condition $DHO \cdot \bar{A}$ (FIG. 4A) is produced. This condition represents the minimum hangover (MHO) state in FIG. 4A. During the MHO state, the timing code for line $L_1$ is decremented every time the line is sampled, as long as the signal A is not present. If the stored timing code is decremented to a value equal to $TC_0$, the condition $MHO \cdot TC_0$ (FIG. 4A) exists. This enables the I detector 27 (FIG. 2B), resulting in the "000" on lines LS1 through LS3 replacing the "110" in the status store 11. The "000" in the status store indicates that the status of line $L_1$ has returned to idle as shown in FIG. 4A. Additionally, gate 47, which was enabled during DHO, is disabled and gate 46 is enabled. This results in the TDNC signal being generated and line $L_1$ is disconnected from its transmission line.

On the other hand, if the signal A (FIG. 2B) is generated before $TC_0$ is reached, then the status of line $L_1$ becomes DHO (FIG. 4A) again and the decremented timing code for line $L_1$ begins to be incremented toward $TC_2$ again.

DETAILED DISCUSSION OF VARIABLE SENSITIVITY

The above discussion illustrates how the various connection requirement states are assigned to a line by the status control 10 (FIG. 2B). This discussion was handled as though there was only one level of sensitivity in order to simplify it. However, as has been mentioned earlier, the sensitivity control 8 (FIG. 2A) has a variable sensitivity feature which becomes operative when there is a DHO to WT (FIG. 4A) transition of the connection requirement status for a line. It also remains operative during the LT state (FIG. 4A). The following discussion considers the operation of the variable sensitivity feature when the line $L_1$ has the WT connection requirement state assigned to it. Generally, the variable sensitivity operates in the same manner during either of the above talker states.

When the connection requirement status of line $L_1$ becomes WT, it has been active long enough to indicate that, in all probability, there is a talker on the line. This being the case, it is desirable to determine the amplitude of the speech signals and adjust the sensitivity in a manner approximating the distribution in FIG. 14. That is, if the talker's speech signal amplitude is relatively high, FIG. 14 shows that the same quality of speech transmission can be obtained for this talker with a lower sensitivity than would be required if he were talking more softly. This reduction in sensitivity is desirable, when possible, because it minimizes the speech detector response to noise. However, since the sensitivity may already be at a low level due to the preceding speech signal on the line, it is initially increased one level at the time of the DHO to WT (FIG. 4A) transition to insure good service. After this initial increase, the sensitivity is then reduced from sample to sample of the line if the current signal amplitude on the line is sufficient to warrant the reductions.

As was mentioned above, the amplitude level signals $A_0$ through $A_3$ and L, shown in FIGS. 2 and 3, are digitized signals representing various amplitude levels of a signal appearing on a line. The level $A_0$ represents the minimum signal amplitude on a line, during the speech detectors most sensitive state, that will result in the activity signal A (FIG. 2A) being generated. The signal on a line is applied to all of the level detectors 16 through 20 (FIG. 2A) simultaneously and results in the generation of all the amplitude level signals representing amplitude levels less than or equal to the peak amplitude of the signal. For instance, if the signal on a line had an amplitude sufficient to generate the signal L (FIG. 2A), it would also generate the signals $A_0$ through $A_3$.

Referring to FIG. 3, the $A_i$ notations in the various circles in the variable sensitivity state diagram represent the minimum sufficient amplitude level signal required for the generation of the activity signal A (FIG. 2A) when the binary reference value in the circle is in the sensitivity store 9. For example, if the speech detector is in its most sensitive state for the line being sampled, the reference value in the sensitivity store 9 (FIG. 2A) is "00." Returning to FIG. 3, it is found that the amplitude of the signal on the sampled line must be at least sufficient to generate the amplitude level signal $A_0$ if the sensitivity control 8 (FIG. 2A) is to generate the activity signal A for this sample of the line. Similarly, if the reference value in the sensitivity store 9 is "01" for a line, then the signal amplitude on that line must be sufficient to generate the signal A1 if the activity signal A is to be generated.

The four levels of speech detector sensitivity are represented by the four binary reference values "00," "01," "10" and "11." The value "00" represents the most sensitive state and "11" represents the least sensitive state.

The variable sensitivity state diagram in FIG. 3 shows the operation of the variable sensitivity write control 25 (FIG. 2A) which alters the speech detector sensitivity in sequential steps, as a function of line signal amplitude. It is possible that the sensitivity of the speech detector to signal samples on a given line will be altered a number of times during the interval the state assigned to the line is WT or LT (FIG. 4A), if the signal amplitude on the line is varying significantly. However, the sensitivity will never be altered by more than one step in the sequence shown in FIG. 3 for a single sample of the line. In other words, the sensitivity could not be decreased from the most sensitive level to the least sensitive level during one sample of a line. This would be accomplished by decreasing the sensitivity one level for each sample of the line until the speech detector was in its least sensitive state.

Figure 10:
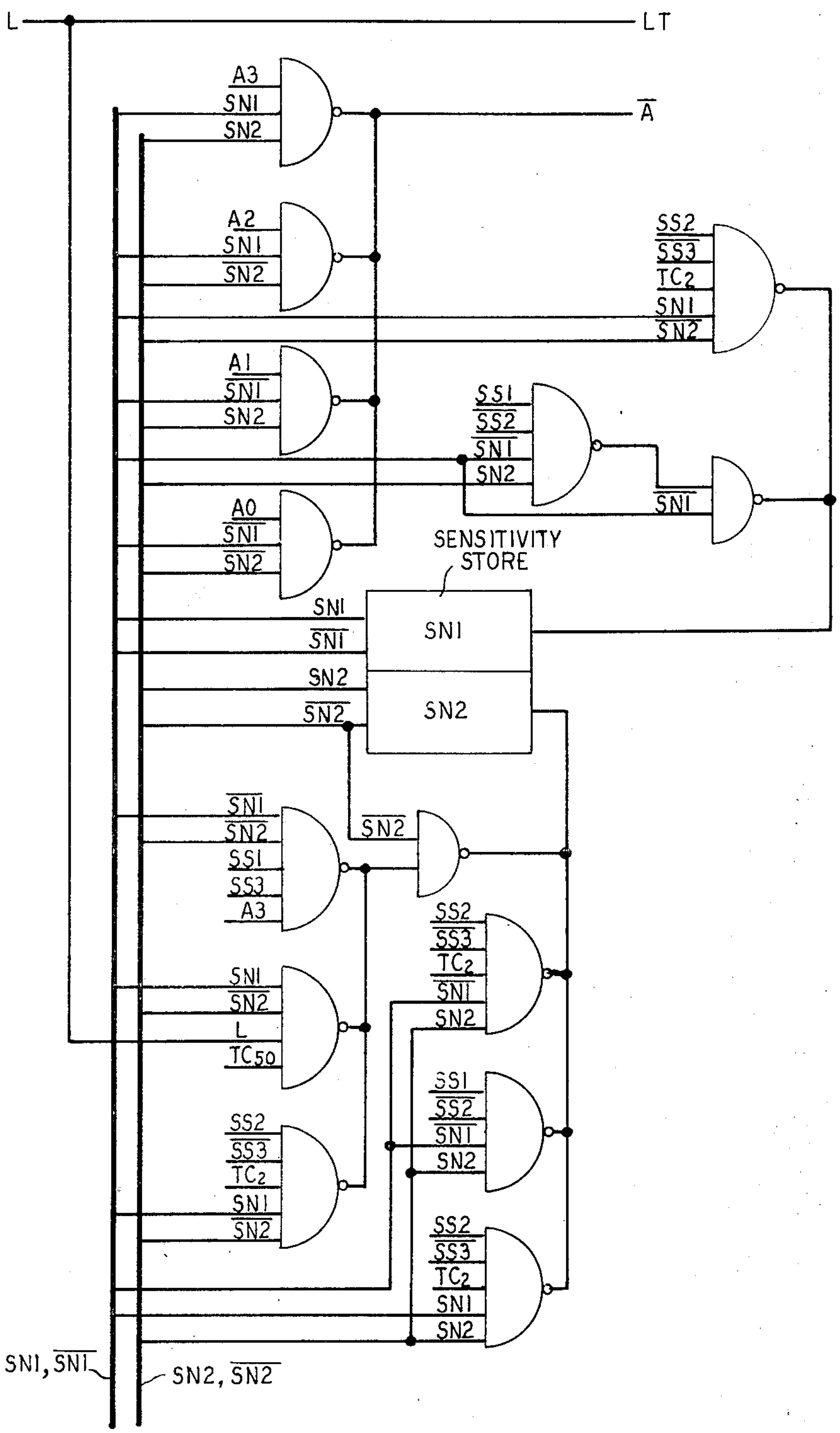
FIG. 10 shows NAND logic circuitry for the variable sensitivity control.

Referring to FIG. 2A, even after the line $L_1$ has become active and remained so long enough for the connection requirement state WT to be assigned to it, the reference value "00" is still in the line $L_1$ slot of the sensitivity store 9 during the first sample of the line in the WT state. This is due to the fact that the variable sensitivity remains inactive during the I, OT and DHO states (FIG. 4A). At this time, the WT state (FIG. 4A) is available as an input to the sensitivity write control 25. If the signal amplitude on line $L_1$ is sufficient to generate the amplitude level signal $A_3$, the amplitude level signals $A_0$ through $A_2$ are also generated. These signals are transmitted through the commutator brush 6 to their respective comparators 21 through 24. The reference value "00" in the sensitivity store is also available on line PSN as an input to the comparators at this time. Of these comparators, only comparator 24 can be enabled when the reference value "00" is on the line PSN. As was previously mentioned, this comparator requires the "00" input and the presence of the amplitude level signal $A_0$ before it will generate an output. Since the signal on line $L_1$ did generate the level signal $A_0$, the condition $A_0 \cdot (00)$ (FIG. 3) exists and comparator 24 is enabled generating the activity signal A. Logic for the comparators is shown in FIG. 10.

Additionally, since the reference value "00" is present on PSN and the signal amplitude on line $L_1$ was sufficient to generate the amplitude level signal $A_3$, the condition $A_3 \cdot WT \cdot (00)$ exists. Referring to FIG. 3, this is the condition for reducing the speech detector sensitivity to its second most sensitive state. The signals $A_3$, "00," WT, and the present status of line $L_1$ are introduced into sensitivity write control 25 (FIG. 2A). The logic of the sensitivity write control 25 is such that the simultaneous existence of the signals $A_3$, "00," and WT results in the reference value "01" replacing "00" in the line $L_1$ slot of sensitivity store 9, in accordance with FIG. 3. Logic for the sensitivity write control is shown in FIG. 10.

This, in effect, has decreased the sensitivity of the speech detector one step. The next time line $L_1$ is sampled its new reference value "01" will be present on line PSN and it will be applied simultaneously to all the comparators 21 through 24 (FIG. 2A). The logic of the comparators is such that only comparator 23 is capable of being enabled with "01" on the line PSN; and it will be enabled only if the signal $A_1$ is also present as its other input. Consequently, the activity signal A will be generated only if the signal amplitude on line $L_1$ is sufficient to produce the amplitude level signal $A_1$. If it is, the logical term $A_1$ (01) (FIG. 3) will enable comparator 23 (FIG. 2A) and the activity signal A will be generated.

On the other hand, if the signal amplitude on line $L_1$ is only high enough to produce the signal $A_0$, the signal $A_1$ will not be present, comparator 24 will not be enabled and the activity signal A will not be generated. This demonstrates how the presence of "01" in the sensitivity store 9 reduces the spech detector sensitivity to the point that a signal amplitude on line $L_1$ must exceed the level required to generate $A_0$, and be sufficient to generate the signal $A_1$, in order for the activity signal A to be generated during a sample of the line.

For the situtaion where the reference value in sensitivity store 9 is "01" and the signal amplitude on line $L_1$ increases to the point that it will generate the amplitude level signal L. The sensitivity will be reduced another step in a manner analogous to that described above. Since the signal amplitude can produce the amplitude level signal L, it is, by definition, sufficient to produce the lower level signal $A_1$. Therefore, the condition $A_1$ (01) (FIG. 3) is true, and this is the condition necessary to enable comparator 23 (FIG. 2A) which in turn generates the activity signal A.

Additionally, the condition LT (01) exists; and, referring to FIG. 3, this is the condition which enables the logic in the sensitivity write control 25 (FIG. 2A) that replaces the reference value "01" with the reference value "10." When the "10" has been written into the line $L_1$ slot of the sensitivity store 9, the sensitivity of the speech detector is reduced another step. Signals on line $L_1$ must now have an amplitude sufficient to generate the signal $A_2$ (FIG. 2A) in order for the activity signal A to be generated when line $L_1$ is sampled.

If the signal amplitude on line $L_1$ remains high enough to produce the level signal L (FIG. 2A) every time line $L_1$ is sampled for 50 milliseconds during the WT and LT states, FIG. 3 shows that the speech detector sensitivity will be reduced to its least sensitive state. The 50 millisecond period is timed using the line $L_1$ timing code slot in the timing code store 44 (FIG. 2B). As was mentioned above, since no timing is required for connection requirement status information during the WT or LT states, the $TC_0$ timing code (00000) is written into the line $L_1$ timing slots when either of these states is entered. Logic is provided in the timing unit 14 for incrementing this code every time the signal L (FIG. 2A) occurs for a sample of line $L_1$ during the talker state. The logic for this unit is shown in FIG. 7. Consequently, if either of the preceding logical terms is true for every sample of line $L_1$ during a 50 millisecond period, the $TC_0$ timing code orginally stored in the line $L_1$ timing code slot will be incremented to the point where it equals a preselected reference timing code $TC_{50}$. When this occurs, there will be a signal generated by timing code detector 45 (FIG. 2B) indicating the signal L has been continuously generated 50 milliseconds. Additionally, if the connection requirement status was orginally WT (FIG. 4) when L occurred, it will have been replaced by LT due to the generation of L. The $TC_{50}$ signal is transmitted to the sensitivity write control 25 (FIG. 2A) and results in the sensitivity being reduced to the "11" level in accordance with FIG. 3.

If the amplitude level signal L (FIG. 2A) is initially generated by samples of line $L_1$, but it is not generated continuously for 50 milliseconds, then the resulting incremented timing code in the timing code storage slot is replaced by $TC_0$ (00000) for the first sample of line $L_1$ where the level signal L is not generated. This insures that the compare signal $TC_{50}$ is generated only after the level signal L has been generated continuously for 50 milliseconds. The logic for incrementing the stored timing code upon the occurrence of either $WT \cdot L$ or $LT \cdot L$ (FIG. 3) is shown in FIG. 7. The logic for writing all zeros in the timing code store when the signal L is not produced is shown in FIG. 9.

Considering the first sample of line $L_1$ after its signal amplitude has been high enough to generate the signal L for 50 milliseconds, the signal $A_2$ will also be present since it represents a lower signal amplitude level than signal L. The sensitivity store 9 (FIG. 2A) contains the reference value "10" at this time since the high amplitude signals have been present on the line $L_1$ long enough to reduce sensitivity to this level. This being true, the condition $A_2 \cdot (10)$ exists and this is the condition necessary to enable comparator 22 which in turn generates the activity signal A. Additionally, the condition $LT \cdot (10) TC_{50}$ exists (FIG. 3). This is the condition which enables sensitivity control 25 which in turn replaces the "10" in the sensitivity store with the new reference value "11." This reduces the speech detector sensitivity to the point that only signals with an amplitude sufficient to produce the level signal $A_3$ will result in the generation of the activity signal A. That is, the presence of "11" on PSN when line $L_1$ is sampled will allow only comparator 21 to be enabled and this comparator will be enabled only if the signal $A_3$ is also present.

FIG. 3 indicates that in order for the speech detector sensitivity to a signal on line $L_1$ (FIG. 2A) to be reduced to its least sensitive level, represented by the $A_3$ level in FIG. 3, the connection requirement status of the line must be the LT state (FIG. 4A). If during the LT state, the signal amplitude on line $L_1$ decreases so that the signal A (FIG. 4A) is no longer generated, the line's connection requirement status becomes the $H_1$ hangover state (FIG. 4A). Moreover, assuming that the signal A is not generated before the interval represented by the occurrence of $TC_{50}$ (FIG. 4A) occurs, the connection requirement status of line $L_1$ will change from the $H_1$ state to the idle state I.

As was indicated earlier, if the line $L_1$ (FIG. 2A) connection requirement status becomes $H_1$ (FIG. 4A) while the speech detector sensitivity to signals on the line is at the reduced level $A_3$, the speech detector sensitivity will remain at this level until the connection requirement status for the line becomes the WT state (FIG. 4A) again. That is, the "11," which represents the $A_3$ sensitivity level (FIG. 3), will remain unaltered in the sensitivity store 9 (FIG. 2A) until the line achieves a talker status again. As long as the speech detector's sensitivity to signals on line $L_1$ remains at the reduced $A_3$ level, the speech detector will not respond to signals on line $L_1$ (FIG. 2A) which have insufficient amplitude to generate the signal $A_3$ (FIG. 3).

When the signal amplitude on line $L_1$ increases again and becomes sufficient to generate the signal $A_3$ (FIG. 3), the signal A (FIG. 4A) will be generated and the connection requirement for the line will become OT (FIG. 4A). If the signal amplitude on line $L_1$ remains sufficient to generate the signal $A_3$ (FIG. 3) until the condition $DHO \cdot TC_2$ (FIG. 4A) occurs, there will be a transition in the connection requirement status of the line from DHO to WT (FIG. 4A). As was noted earlier, when the connection requirement status of a line becomes the WT state there is, in all probability, a talker on the line. At the time this transition occurs, the sensitivity of the speech detector will be increased one level, from the $A_3$ level to the $A_2$ level, in accordance with FIG. 3.

From FIG. 3, the condition $DHO \cdot TC_2 \cdot (11)$ results in the speech detector sensitivity being increased by replacing the "11" in the sensitivity store with "10." This is accomplished by the sensitivity write control 25 (FIG. 2A). With "10" in the sensitivity store 9, the activity signal A will now be produced for line $L_1$ if the signal amplitude on it is sufficient to generate the lower level signal $A_2$ (FIG. 2A) That is, when $L_1$ is sampled and produces the signal $A_2$, the condition $A_2 \cdot (10)$ (FIG. 3) exists. This is the condition necessary to enable comparator 22 (FIG. 2A), which in turn generates activity signal A.

Upon the next sample of the line $L_1$, after the initial increase in speech detector sensitivity, and for every sample during the period the lines connection requirement is a talker state, the signal amplitude on the line is evaluated. If, during this period, the signal amplitude on the line is sufficient, the sensitivity of the speech detector to signals on the line will be decreased again according to FIG. 3. For example, in the present case, if the signal amplitude on line $L_1$ has risen to the point where it generates the signal L (FIG. 4A) continuously for 50 milliseconds, the timing compare signal $TC_{50}$ will occur. Consequently, the logic term $L \cdot TC_{50}$ (FIG. 3) will be true and the speech detector sensitivity will be reduced from the $A_2$ level (FIG. 3) back to the $A_3$ level.

The purpose of initially increasing the speech detector sensitivity upon the DHO to WT (FIG. 4A) transition of line $L_1$ connection requirement status is to insure that the talker on the line gets adequate service. The sensitivity is then reduced, according to FIG. 3 if later samples of the signal amplitude on the line indicate that the talker can be adequately served at a lower level of sensitivity.

FIG. 3 also indicates that if line $L_1$ is in idle state I (FIG. 4A) and the speech detector sensitivity for the line is at the $A_2$ level (FIG. 3), substantially the same operations as those discussed above may occur. If the signal amplitude on line $L_1$ becomes sufficient to generate the signal $A_2$ and this increased amplitude continues to exist until $DHO \cdot TC_2$ (FIG. 4A) occurs, there will be a DHO to WT transition in the line's connection requirement status. When the line's connection requirement status becomes the WT state (FIG. 4A), the speech detector sensitivity is initially increased one level. The only difference between this and the above case is that in this case the speech detector sensitivity is increased from the $A_2$ level to the $A_1$ level instead of the $A_3$ level to the $A_2$ level.

As was mentioned above, the DHO to WT (FIG. 4A) transition occurs when the condition $DHO \cdot TC_2$ is true. Referring to FIG. 3, the logic term $DHO \cdot TC_2 \cdot (10)$ (FIG. 3) enables the sensitivity control 25 (FIG. 2A) which replaces the reference value "10" in the sensitivity store 9 (FIG. 2A) with "01." Consequently the next time line $L_1$ is sampled its signal amplitude need only be sufficient to generate the amplitude level signal $A_1$ in order for the activity signal A to be generated. When this occurs, the condition $A_1 \cdot (01)$ (FIG. 3) exists which enables comparator 23 (FIG. 2A) resulting in the generation of the activity signal A.

After the speech detector sensitivity has been increased to the $A_1$ level (FIG. 3), the signal amplitude on line $L_1$ continues to be evaluated, from sample to sample, as long as the line's connection requirement status is a talker state. If the signal amplitude on the line is sufficiently high, the speech detector sensitivity may be reduced to the $A_2$ or $A_3$ levels in accordance with FIG. 3.

Similarly, when the line $L_1$ is in the idle state I (FIG. 4A) and the speech detector sensitivity is at the $A_1$ level (FIG. 3), the sensitivity will be increased one level if the signal amplitude on the line becomes sufficient to result in a DHO to WT state transition (FIG. 4A). In order for this transition to take place, the signal amplitude on line $L_1$ will have to become, and remain, sufficient to produce the signal $A_1$ (FIG. 2A) until $DHO \cdot TC_2$ (FIG. 4A) is true. As was noted above, $DHO \cdot TC_2$ (FIG. 4A) will result in the DHO to WT state transition (FIG. 4A). Consequently, since at the time of the transition the speech detector sensitivity is at the $A_1$ level (FIG. 3), the condition $DHO \cdot TC_2 \cdot (01)$ will be true.

Referring to FIG. 3, the condition $DHO \cdot TC_2 \cdot (01)$ being true results in the "01" in the sensitivity store 9 (FIG. 2A) being replaced by "00." This again is accomplished by the logic in the sensitivity write control 25 (FIG. 2A) which is enabled by the logical term $DHO \cdot TC_2 \cdot (01)$ to write "00" in the reference value storage slot for line $L_1$. In this situation, the signal amplitude on line $L_1$ need only be sufficient to generate the amplitude level signal $A_0$ (FIG. 2A) in order for the activity signal A (FIG. 2A) to be produced. When the amplitude level signal $A_0$ is produced by a succeeding sample of line $L_1$, the reference value "00" is present on PSN and this represents the input $A_0 \cdot (00)$ necessary to enable comparator 24 (FIG. 2A) which generates the activity signal A.

Here again, as in both of the above cases, after the speech detector sensitivity has been initially increased, the signal amplitude on line $L_1$ continues to be evaluated from sample to sample as long as the line's connection requirement is a talker state, WT or LT (FIG. 4A). If the signal amplitude on the line is sufficiently high, the speech detector sensitivity may now be reduced to the $A_1$, $A_2$, or $A_3$ (FIG. 3) levels in accordance with FIG. 3.

The above description has demonstrated how the speech detector sensitivity is sequentially varied, step by step, as a function of signal amplitude once a talker state such as WT or LT has been assigned to the line being sampled. It is possible for the sensitivity of the speech detector to go from its most sensitive state to its least sensitive state in 50 milliseconds from the time a talker status is achieved by the line being sampled. This would occur if the signal on a line were sufficient to produce all the signals $A_0$ through $A_3$ and L (FIG. 2A) when it was assigned a talker state such as WT. The first sample of the line, after the DHO to WT transition, would result in the sensitivity going from the most sensitivity state "00" (FIG. 3) to the next most sensitive state "01." The second sample would further reduce the sensitivity from the "01" level to the "10" level. Then, after the remainder of the 50 milliseconds passed, the sensitivity would be reduced from the "10" level to the "11" level which is the lowest level of speech detector sensitivity.

The operation of the variable sensitivity feature may be summed up as follows: Once a line is assigned a talker status such as WT or LT (FIG. 4A) the variable sensitivity control is enabled and varies the speech detector sensitivity to signals on the line. The speech detector sensitivity is varied as a function of both the signal amplitude on the line and the current speech detector sensitivity level. Initially, when the DHO to WT or LT state transition occurs, the speech detector sensitivity is increased one level. However, as the signal amplitude on the line continues to be sampled during the talker state, the speech detector sensitivity may be reduced to a lower level if the signal on the line has a sufficiently high amplitude. Upon the termination of the line's existing talker state, the variable sensitivity becomes in operative with regard to that particular line. When this occurs the speech detector sensitivity to subsequent signals on the line remains at the same level it was at when the talker state of the line was terminated.

The foregoing explanation has dealt with successive samples on only one line. However, it is clear that, since the common equipment is time shared by a plurality of lines, its operation would be substantially the same for any line being sampled repetitively. The only difference would be that different memory locations in the sensitivity store 9 (FIG. 2A), status store 11 (FIG. 2B), and timing code store 44 (FIG. 2B) would be used by different lines.

DESCRIPTION OF FOUR ACTIVITY SIGNAL SYSTEM

The system in FIG. 2A shows the outputs of the comparators 21 through 24 connected as inputs to an OR gate 27 which produces a single activity signal A. It is obvious that if no OR gate were used, four activity signals could be obtained, one from each comparator. Each of these activity signals would contain information about the signal level on the line being sampled. In other words, the amplitude level signal $A_1$ (FIG. 2A) could be combined with the signal "01" on line PSN to enable comparator 23 and the resulting signal could be denominated activity signal $A_1$. This activity signal not only indicates that line $L_1$ is active, it also indicates that the signal amplitude on line $L_1$ is high enough to result in activity signal $A_1$ being generated. Activity signals such as these provide line signal amplitude information for the status control in addition to that provided by the amplitude level signal L. By using these four activity signals $A_0$ through $A_3$, weak talkers may be subdivided into four categories and the speech detector characteristics can be altered to fit the needs of any one of these four types. That is, a very weak talker needs more hangover than a moderately weak talker; therefore, using the multiple activity signal system, different hangovers can be provided for different categories of weak talkers. This allows further minimization of the time a particular type of weak talker is connected to a transmission line when he is not talking. The use of these additional activity signals allows the distributions shown in FIGS. 14 through 16 to be more closely approximated than is possible using a single activity signal.

Figure 13B:
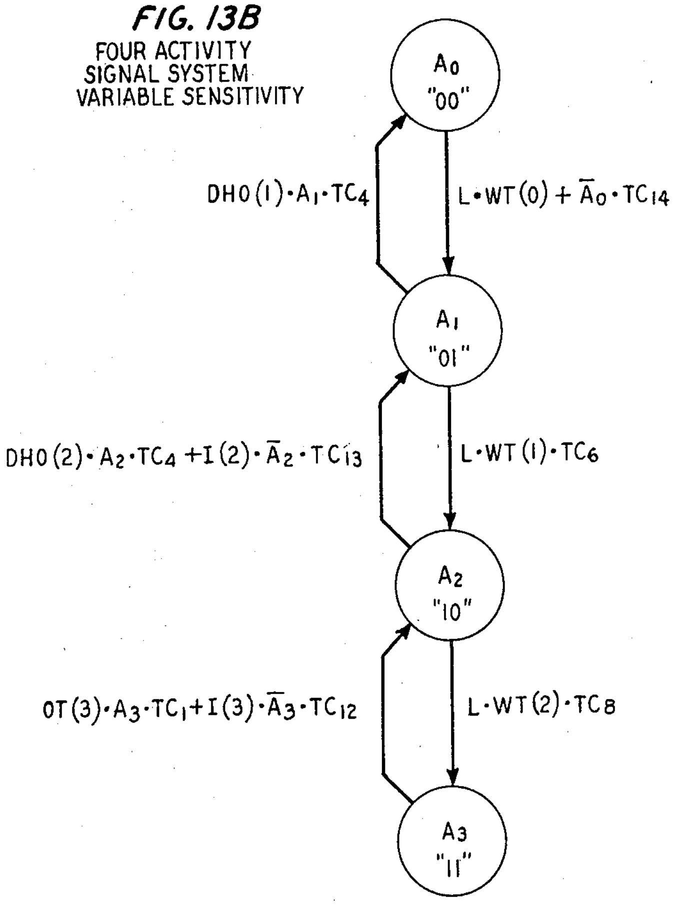
FIG. 13B shows a state diagram of the variable sensitivity in the four activity signal version of applicant's invention.

FIG. 13B shows a state diagram for the variable sensitivity in the four activity signal system. The operational characteristics of the variable sensitivity shown in FIG. 13B can be realized using the same apparatus that is used in the one activity signal system (FIG. 2), but adjusting the logic of FIGS. 5 through 10 accordingly.

Conceptually, the operation of the multiple activity signal system's variable sensitivity is the same as the operation of the single activity variable sensitivity. The differences in operation consist entirely of differences in the logic terms required to alter the sensitivity, the initial sensitivity level of the speech detector to signals on a line becoming active, and the method of increasing sensitivity to this initial level from a lower level. The types of minor alteration required in going from the one activity signal system to the four activity signal demonstrate the appropriateness of stating, as one of the advantages of the invention, the ease of modification.

Referring to FIGS. 3 and 13B, these state diagrams show that the sensitivity in both systems is decreased step by step. However, it will be noted that when a line has not been in use for some time, or it has been ON-HOOK, the initial sensitivity level in FIG. 13B will be the level represented by "01." This differs from the variable sensitivity shown in FIG. 3 which provides no increase in sensitivtiy as a function of the time a line has been inactive. By decreasing the initial sensitivity of the speech detector to initial signals on a previously dormant line one step, the response of the speech detector to noise is decreased. Additionally, in order to decrease the sensitivity from the "00" level in FIG. 13B when a line is active, the amplitude level signal L (FIG. 2A) must be present whereas in FIG. 3 this transition is made if the amplitude level signal $A_3$ is present. The only other difference is, that in order to successively reduce the sensitivity from level "01" to level "11" in FIG. 13B both the signal L and a timing compare are required. In FIG. 3, both L and a timing compare were required only to decrease sensitivity from the "10" level to the "11" level. The logic terms $$L \cdot WT(0) \cdot (00),\ L \cdot WT(1) \cdot TC_6 \cdot (01)$$

and $$L \cdot WT(2) \cdot TC_8(10)$$

(FIG. 13B) correspond to the logic terms $$A_3 \cdot WT \cdot (00),\ LT \cdot (01) \text{ and } L \cdot TC_{50}(10)$$

respectively, in FIG. 3. In general, the operation of these two types of variable sensitivity in decreasing sensitivity are the same except that the type shown in FIG. 13B requires a higher signal amplitude of longer duration on a line to reduce sensitivity than the type shown in FIG. 3.

Similarly, the sensitivity is increased in the type of variable sensitivity shown in FIG. 13B in essentially the same way as sensitivity is increased by the type shown in FIG. 3. The key differences are different logic terms, the number of levels the sensitivity is increased, and the return to an initial sensitivity level, by the FIG. 13B variable sensitivity, after a line no longer has a talker on it.

The logic terms $$I(3) \cdot \bar{A}_3 \cdot (11) \cdot TC_{12},\ I(2) \cdot \bar{A}_2 \cdot (10) \cdot TC_{13}$$

and $$I(0) \cdot \bar{A}_0 \cdot (00) \cdot TC_{14}$$

(FIG. 13B) are provided to return the speech detector to the $A_1$ sensitivity level when there have been no signals on a line for an extended period. For example, when the line is not in use. This merely extends the variable sensitivity shown in FIG. 3 which leaves the speech detector sensitivity to signals on a line at the same level it was when the line lost its talker status.

The primary difference between the two types of variable sensitivity is shown by the increasing of sensitivity when the logic terms $DHO(1) \cdot A_1 \cdot TC_4$, $DHO(2) \cdot A_2 \cdot TC_4$ and $OT(3) \cdot A_3 \cdot TC_1$ occur in the type of variable sensitivity shown in FIG. 13B. As was stated earlier, this too is merely an extension of the principles shown in FIG. 3. The first two logic terms allow the sensitivity to be increased one level when the DHO to WT (FIG. 13A) transition in a line's connection requirement status occurs. Aside from the difference in logic terms, this is identical to the variable sensitivity shown in FIG. 3. The logic term $OT(3) \cdot A_3 \cdot TC_1$ (FIG. 13B), however, allows the sensitivity to be increased before a line achieves a talker status. In other words, this logic term allows an increase in sensitivity at the time of the OT(3) to DHO(2) (FIG. 13A) transition. Snch an increase in sensitivity level is not provided by the variable sensitivity in FIG. 3.

An example of the increase in sensitivity when the DHO to WT transition occurs is as follows: If a line has been processed with the sensitivity at the "01" level (FIG. 13B) and $DHO(1) \cdot A_1 \cdot TC_4$ occurs, indicating the line is to be assigned the WT status, the sensitivity is increased to the "00" level simultaneously with the WT(0) (FIG. 13A) status being assigned to the line. The reason for this initial increase in sensitivity is the same as that given for the increase provided by the variable sensitivity in FIG. 3. It insures adequate service for the talker on this line. After the initial increase in sensitivity, the signal amplitude is re-evaluated, from sample to sample of the line, to determine if the talker can be adequately served at a lower sensitivity level. The increase in sensitivity at the time the OT(3) to DHO(2) (FIG 13A) transition occurs will be discussed later.

Figure 13A:
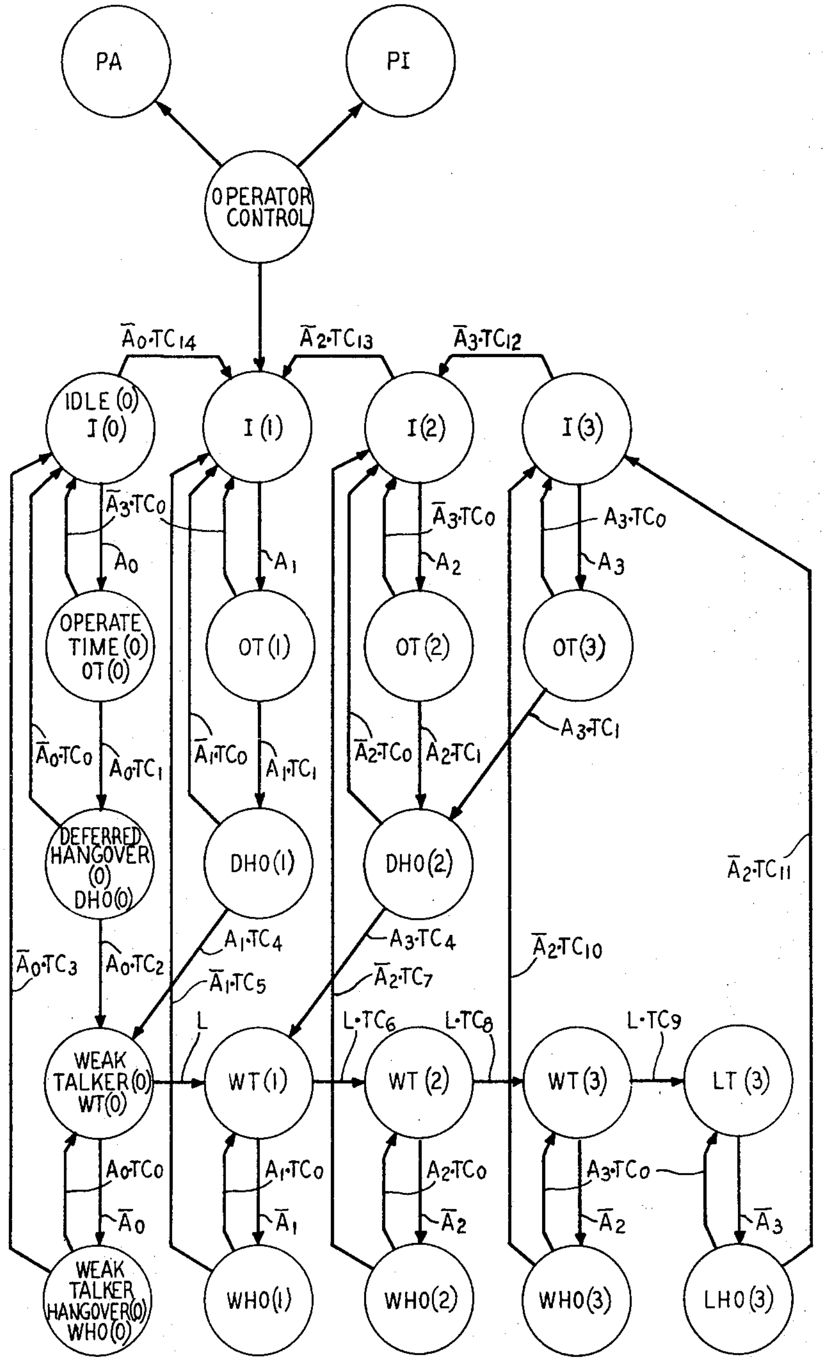
FIG. 13A shows a state diagram of applicant's invention adapted to use four activity signals instead of one.

Referring to FIG. 13A, the state diagram shows the operation of a status control which is essentially the same as the one shown in FIG. 4A. The key difference, outside of modified logic terms, is the fact that the state diagram in FIG. 13A has four distinct branches leading to the point where a line is assigned a talker status. This results from the use of the four activity signals $A_0$ through $A_3$ in this status control as opposed to the use of a single activity signal A in the FIG. 4 status control. The branches in the FIG. 13A state diagram, I(0), I(1), I(2), and I(3), each represent the operation of the status control for the situation where the sensitivity is such that the activity signal $A_0$, $A_1$, $A_2$, or $A_3$, respectively, is being generated by the signal amplitude on the line being sampled. In other words, if the sensitivity write control 25 (FIG. 2A) has written "01" in the sensitivity store 9 (FIG. 2A) for a line, any signal amplitude on that line, extending a minimum value, will generate only the activity signal $A_1$ since only comparator 23 (FIG. 2A) can be enabled with "01" in the sensitivity store 9. Returning to FIG. 13A, when activity signal $A_1$ is present, the operation of the status control is represented by the branch whose initial state is I(1).

Another difference is that instead of having only a WT and LT state, as in FIG. 4A, the status control shown in FIG. 13A has a WT(0), WT(1), WT(2), WT(3), and an LT(3) state. The additional gradation for the WT state is as adopted to provide better service for varying degrees of weak talkers.

An example of the operation of the four activity signal status control (FIG. 13A) will demonstrate the similarity between it and the operation of the single activity signal status control (FIG. 4A). Suppose a line $L_1$ (FIG. 2A), which has been ON-HOOK, becomes active. From FIG. 13B, the sensitivity reference value in sensitivity store is "01," which represents the initial sensitivity of the speech detector to signals on a line becoming active. With "01" in the sensitivity store 9, only comparator 23 (FIG. 2A) can be enabled. Consequently, the signal amplitude on line $L_1$ (FIG. 2A) must be sufficient to generate amplitude level signal $A_1$ if comparator 23 is to be enabled. When this occurs, comparator 23 (FIG. 2A) generates a signal which, in the four activity signal system, will be denominated activity signal $A_1$. Since the sensitivity of the speech detector was such that the activity signal $A_1$ would be produced by sufficient signal amplitude on line $L_1$, the operation of the status control resulting from activity signal $A_1$ is represented by the branch of the state diagram (FIG. 13A) having I(1) as its initial state. Here, as in the one activity signal system, the connection requirement status of line $L_1$ is changed from the idle (I) state to the operate time (OT) state due to the presence of the activity signal. In this case the idle state I(1), assigned to line $L_1$, is replaced by the operate time state OT(1). Similarly, the status of line $L_1$ will continue to be represented by the OT(1) state until the activity signal $A_1$ has been generated continuously for a selected interval. When timing compare $TC_1$ occurs the OT(1) state is replaced by the DHO(1) state. Here again, the DHO(1) state will continue to exist until activity signal $A_1$ has been continuously generated for another preselected interval represented by $TC_4$.

When the condition $A_1 \cdot DHO(1) \cdot TC_4$ (FIG. 13A) occurs, the connection requirement status of line $L_1$ (FIG. 2) is changed to the weak talker state WT(0). It will be noted that this transition involves going to a state in the I(0) branch of the state diagram (FIG. 13A). This branch represents operation of the status control when the activity signal $A_0$ is present. In order to allow this mode of operation, the sensitivity of the speech detector is increased one step by replacing the "01" in the sensitivity store 9 (FIG. 2) with "00" when $A_1 \cdot DHO(1) \cdot TC_4$ exists (FIG. 13B). When this is done, the signal amplitude on line $L_1$ need only be sufficient to generate the amplitude level signal $A_0$ (FIG. 2A) in order to result in activity signal. Additionally, since "00" is in the sensitivity store 9 (FIG. 2A), only comparator 24 (FIG. 2A) can be enabled. Consequently, any activity signal produced during the existence of this condition will be the activity signal $A_0$. The sensitivity is increased in the DHO(1) WT(0) (FIG. 13A) transition to insure adequate service for the talker on the line.

Once the transition to WT(0) (FIG. 13A) has been made, the operation of the status control is that indicated by the branch of state diagram of FIG. 13A whose initial state is I(0). If the signal amplitude on line $L_1$ is not sufficient to generate the amplitude level signal L, the operation of the status control, indicated by this branch, is the same as the operation of the single activity signal status control (FIG. 4A).

However, if the signal amplitude on line $L_1$ (FIG. 2A) increases to the point that it results in amplitude level signal L being generated while the status of the line is WT(0) (FIG. 13A), the condition $L \cdot WT(0)$ exists and the status of the line becomes WT(1). Here again, this transition involves altering speech detector sensitivity as well as changing the connection requirement state for line $L_1$. Sensitivity is reduced because the presence of signal L indicates the line may be adequately served with lower sensitivity and such a reduction decreases speech detector response to noise. FIG. 13B shows that sensitivity is decreased one step when the condition $L \cdot WT(0) \cdot (00)$ exists. This change in sensitivity allows only comparator 24 (FIG. 2A), which generates activity signal $A_1$, to be enabled when the signal amplitude on line $L_1$ is of sufficient magnitude. The transition from the WT(0) to the WT(1) state (FIG. 13A) is identical to the WT to L transition in FIG. 4, to the extent that it provides less hangover for higher amplitude signals on line $L_1$. If the signal amplitude on line $L_1$ decreases to the point that it will not generate amplitude level signal L continuously until the timing compare signal $TC_6$ (FIG. 13A) occurs, the operation of the speech detector is represented by the branch of the state diagram whose initial state is I(1).

For the case where the connection requirement status of line $L_1$ (FIG. 2) is WT(1) (FIG. 13A) and the signal L is generated continuously until $L \cdot WT(1) \cdot TC_6$ occurs, the connection requirement status of line $L_1$ is again changed. The state WT(1) (FIG. 13A) is replaced by the state WT(2). This is accompanied by a further decrease in sensitivity to reduce the speech detector response to noise. FIG. 13B shows that when $L \cdot WT(1) \cdot TC_6(01)$ occurs the "01" in sensitivity store 9 (FIG. 2A) is replaced by "10." This allows only comparator 22 (FIG. 2A), which generates activity signal $A_2$, to be enabled. Consequently, the only activity signal that will now be generated for line $L_1$ is the activity signal $A_2$, and in order for it to be generated, the signal amplitude on the line must be sufficient to produce amplitude level signal $A_2$ (FIG. 2A). Additionally, the length of hangover for line $L_1$, if it becomes inactive during the WT(2) state, may be further reduced. This reduction in hangover is based on the signal amplitude represented by amplitude level signal L and the duration of its continuous generation. If the generation of signal L ceases before the condition $WT(2) \cdot TC_8$ occurs, the operation of the status control is represented by I(2) branch of FIG. 13A.

On the other hand, if the amplitude level signal L continues to be generated by signal on line $L_1$ until $L \cdot WT(2) \cdot TC_8$ (FIG. 13A) occurs, the WT(2) status of line $L_1$ is replaced by WT(3). When this transition occurs in the connection requirement status, FIG. 13B shows that the existence of $L \cdot WT(2) \cdot TC_8 \cdot (10)$ results in the speech detector sensitivity being further reduced to its least sensitive state. At this sensitivity level, the response of the speech detector to noise is minimal. Also the hangover provided for line $L_1$ in the WT(3) state (FIG. 13A) is further reduced since the continued generation of the signal L for the required interval indicates a higher amplitude signal on line $L_1$ than was indicated by reaching the preceding state WT(2). At this point sensitivity can be decreased no further and the I(3) branch of the state diagram represents the operation of the status control.

The continued generation of amplitude level signal L during the WT(3) state (FIG. 13A) results in the status of line $L_1$ changing from WT(3) to LT(3) when $L \cdot WT(3) \cdot TC_9$ occurs. This results in a further reduction of hangover time, based on the amplitude that signals on line $L_1$ must be to reach this state. No reduction in sensitivity is possible for this transition and the operation of the status control continues to be indicated by the I(3) branch of the state diagram.

If, during any one of the talker states WT(1), WT(2), WT(3), or LT(3), line $L_1$ becomes inactive and remains inactive till the respective hangover state WHO(1), WHO(2), WHO(3) or LHO(3) expires, the status of line $L_1$ becomes the indicated idle state. The status of line $L_1$ will remain one of the idle states I(1), I(2), or I(3) for selected intervals if the line remains inactive. It will be remembered that these intervals are of long duration; possibly representing an AN-HOOK condition for the line. Referring to FIG. 13B, the inactive line $L_1$ will remain in the I(3) state until the condition $I(3) \cdot \bar{A}_3 \cdot TC_{12}(11)$ exists. At this time the sensitivity of the speech detector will be increased from the "11" level to the "01" level. This corresponds to replacing I(3) with I(1) (FIG. 13A). Similarly, the newly assigned status I(2) of inactive line $L_1$ will continue to exist until the condition $$I(2)\cdot A_2\cdot TC_{13}\cdot(10)$$

(FIG. 13B) occurs. At this time, the sensitivity is increased another step to the "01" level. This corresponds to replacing I(2) with I(1) in FIG. 13A. Since the "01" level of sensitivity is the initial speech detector sensitivity for signals appearing on lines which have not been in use, the "01" remains in sensitivity store 9 and the status of line $L_1$ remains I(1) until the line becomes active again.

On the other hand, if line $L_1$ becomes active before the idle interval in the particular branch of FIG. 13A representing the status control operation expires, the assignment of successive states indicated by that branch occurs as the line remains active.

For instance, if line $L_1$, with a status of I(3) (FIG. 13A), becomes active again, generating activity signal $A_3$ before $TC_{12}$ occurs, the status of the line becomes OT(3). The status of line $L_1$ continues to be OT(3) until $A_3\cdot OT(3)\cdot TC_1$ occurs. This results in the OT(3) state of the line being replaced by DHO(2). Inherent in this transition is the accompanying increase of the speech detector sensitivity from the "11" level to the "01" level. FIG, 13B shows that the existence of $OT(3)\cdot A_3\cdot TC_1(11)$ results in this increase. The reasoning behind this increase in sensitivity is that since line $L_1$ became inactive while the sensitivity was at its lowest level and then became active again, the signal amplitude on the line may be too low to give it adequate service with the speech detector in its least sensitive state.

The status of line $L_1$ remains the DHO(2) state until $A_2\cdot DHO(2)\cdot TC_4$ occurs and the status of line $L_1$ becomes WT(1). The condition $DHO(2)\cdot A_2\cdot TC_4(10)$ (FIG. 13B) results in the sensitivity being increased another step to the "01" level. This increase in sensitivity is made for the same reasons given above for replacing DHO(1) with WT(0); to insure adequate service for the line in its newly assigned talker status.

Similarly, if line $L_1$ has the status I(2) assigned to it and it becomes active, generating the activity signal $A_2$, before $TC_{10}$ occurs, the I(2) state is replaced by the OT(2) state. This state exists until $A_2\cdot DHO(2)\cdot TC_4$ (FIG. 13B) occurs increasing sensitivity to the "01" level. When this occurs the DHO(2) state is replaced by the WT(1) state. The steps in replacing DHO(2) for this case are the same as those described above for the I(3) example.

It will be noted that the state diagram in FIG. 13A also shows two priority states which can be assigned to a line; the priority idle (PI) state and the priority active (PA) state. There is a priority code "111" which the operator of the system manually inserts in the slot of the status store 9 (FIG. 2B) allocated for the line to be effected. This condition combined with the binary output of a manually operated binary switch determines whether the line is maintained in the idle state or the active state. In the priority idle state, gate 46 (FIG. 2B) is continuously enabled for the line whose status is the priority idle state. This results in the continuous generation of a TDNC signal. Consequently, the line will not be connected to a transmission line 60 (FIG. 2) as long as the priority idle state exists. An example of where this might be used is the case where it is desired to keep the source line disconnected while it is being tested.

In the priority active state the gate 47 (FIG. 2B) is enabled and continuously generates a TNC signal as long as the state exists. This results in the source line being continuously connected to a transmission line whether there are signals on it or not. Here again, testing is an example of a case where this might be desirable.

The above has demonstrated the operation of four activity signal systems. Additionally, it has shown the ease with which the operating characteristics of applicant's speech detector may be altered to optimize the quality of service it provides in a given situation. Although the one activity and four activity signal systems are the only ones shown, it is obvious that the system may be modified, within the scope of applicant's invention, to operate with five, six or up to *n* activity signals.

The single activity signal configuration, rather than the four activity signal configuration, was described in detail because it completely discloses the invention but avoids the redundancy inherent in a detailed explanation of a system using multiple activity signals.

It is to be understood that the above-described arrangements are merely illustrative of numerous and varied other arrangements which may form applications of the principles of the invention. These other arrangements may readily be devised by those skilled in the art without departing from the spirit and scope of the invention.

What is claimed is:

1. In combination:

means for repetitively sampling signal levels on a plurality of lines;

common time-shared means for translating said signal level samples from a given line to a line activity signal for said line;

common time-shared means for comparing said activity signals with stored code signals that vary in accordance with a line activity statistical distribution between occurrences of said activity signals for said line to determine the present connection requirement status of said line; and means for generating an output signal dependent upon said present connection requirement status of said line.

2. A signal controlled transmission system comprising:

means for repetitively sampling signal levels on a plurality of lines;

common time-shared data processing means for translating said signal level on a given line to a line activity signal;

common time-shared data processing means for collating said line activity signal with the past connection requirement status of said line to determine its present connection requirement status; and means for generating an output signal dependent upon said present connection requirement status of said line.

3. A signal controlled transmission system according to claim 2 wherein said common time-shared data processing means collates said line activity signal with both said past connection requirement status of said line and timing signals to determine said present connection requirement status.

4. In combination:

a plurality of signal transmission lines;

individual means for detecting the signal level on each of said lines;

means for repetitively scanning said signal level detectors;

common means for generating timing signals;

common time-shared means for generating a line activity signal when said signal level on a sampled line is of sufficient amplitude;

common time-shared means for comparing said line activity signal, the past connection requirement status of said line and said timing signals to determine the present connection requirement status of said line;

means for generating a present connection requirement status signal; and means responsive to said present connection requirement status signal for generating an output signal.

5. The combination according to claim 4 wherein the common time-shared means for generating said line activity signal comprises:

storage means for storing signal level information;

a plurality of comparison means for comparing the present signal level of said line with a statistically determined value stored in said storage means; and comparison means for statistically determining said value to be stored in said signal level storage means.

6. In combination:

a plurality of signal transmission lines;

means for detecting the signal level on each of said lines;

means for repetitively scanning said signal level detectors;

common time-shared comparison means for generating a line activity signal when said signal level on a sampled line is of sufficient amplitude;

common time-shared means for collating said line activity signals with code signals that vary in accordance with a statistical distribution between occurrences of said activity signals to determine the present connection requirement status of said line; and means for generating an output signal dependent upon said present connection requirement status of said line.

7. The combination according to claim 6 wherein said common time-shared collating means comprises:

means for storing connection requirement status;

a plurality of status detectors for comparing said line activity signal of said line with its past connection requirement status, stored in said storage means, to determine the present connection requirement status of said line; and means for storing said persent connection requirement status in said storage means.

8. The combination according to claim 7, further including common means for generating timing signals wherein said plurality of state detectors compare said line activity signal of said line, its past connection requirement status and said timing signals to determine said present connection requirement status of said line.

9. A signal controlled transmission system comprising:

a plurality of signal transmission lines;

individual means for detecting signal levels on each of said lines;

means for repetitively scanning said signal level detectors at regular intervals;

common time-shared means for generating a line activity signal when said signal level on a sampled line is of sufficient amplitude;

common time-shared comparison means for determining the present connection requirement status of said line for each sample thereof;

common means for simultaneously generating pulse trains of different repetition rates;

common means for generating timing signals, controlled by said line activity signal, said present connection requirement status and said pulse trains; and means for generating an output signal dependent upon said present connection requirement status of said line.

10. The signal controlled transmission system according to claim 9 wherein said timing means comprises:

control means for generating control signals dependent upon said line activity signal, said present connection requirement status and said pulse trains;

storage means for storing timing codes;

arithmetic means, controlled by said control signals, for altering stored timing codes in synchronism with line scan rate; and means for generating timing compare signals when the stored timing code of a line equals any one of a plurality of selected reference codes at the time said line is sampled.

11. The system according to claim 9 wherein said pulse train generating means comprises a frequency divider for pulses having a fundamental repetition rate equal to the line scanning rate.

12. A common control signal level detecting system comprising:

pulse generating means responsive to a plurality of amplitude levels of signals on a plurality of lines;

time-divided scanning means for scanning the pulse patterns provided by said pulse generating means;

common time-shared means for comparing each said pulse pattern, in its own time slot, with data representing previous pulse patterns of the same line; and means responsive to said comparing means for generating control signals for each said line.

13. A signal controlled detection system (FIG. 2) comprising pulse generating circuitry (2) for converting sampled analogue signal levels on an input line (50) to patterns of digital signals; common time-shared comparison circuitry (8) for converting the patterns of digital signals to a line activity signal (A); a memory (9, 11, 44) for storing digital signals; timing circuitry (14); and control signal output circuitry (12), the signal controlled detection system being characterized in that it further comprises state detection circuitry (10) for comparing the line activity signals for a line with stored code signals that vary in accordance with a statistical distribution between occurrences of line activity signals for the line to determine the present connection requirement status of the line.

14. The signal controlled detection system of claim 13 further characterized in that the comparison circuitry comprises a plurality of comparators (21–24) for comparing the pattern of digital signals generated by the pulse generating circuitry, when a line is sampled, with a statistical variable to determine if an activity signal will be generated for the line.

15. The signal controlled detection system of claim 13 characterized in that it further comprises a frequency divider (13) for generating a plurality of pulse trains, each of which has a different pulse current frequency; and control circuitry (42), which is selectively responsive to one of the plurality of pulse trains, for controlling the operation of the timing circuitry when an input line is sampled.

16. The signal controlled detection system of claim 13 characterized in that the timing circuitry further comprises detection circuitry (45) for generating a distinct timing signal for each of a plurality of selected codes when that code is present in a line's prescribed location in the memory (44) at the time the line is sampled.

17. A signal controlled transmission system comprising:

a means for repetitively sampling a plurality of signal levels of each of a plurality of lines;

common time-shared data processing means for translating the plurality of sampled signal levels on a given line into a line activity signal for said given line;

a common time-shared data processing means for collating said line activity signal with the past connection requirement status of said given line to determine its present connection requirement status; and means for generating an output signal dependent upon said present connection requirement status of said line.

18. In combination:

means for periodically detecting a plurality of discrete signal levels present in a signal on an input line;

means for comparing the detected signal levels with a variable sensitivity code representing a selected signal level previously detected on said line;

means for generating a line activity signal when the comparison indicates any one of detected signal levels bears a selected relationship to the signal level represented by said sensitivity code;

sensitivity control circuitry for selectively altering said sensitivity code as a function of selected ones of the detected signal levels; and means for comparing said line activity signal with a past connection requirement status code for said line to determine said line's current connection requirement status.

19. The combination in claim 18 wherein said sensitivity control circuitry is responsive to selected combinations of the detected signal levels and past connection requirement codes for said line.

20. The combination of claim 18 wherein said sensitivity control circuitry further comprises:

a storage means; and a plurality of comparators each having one input connected to the output of said storage means and another input connected to a selected one of said detected signal levels.

21. A signal controlled transmission system comprising:

means for repetitively sampling signal levels on a plurality of lines;

a common time-shared variable sensitivity circuitry for altering the system sensitivity to signals on each of said lines as a function of past signal levels on the line;

common time-shared status detector for comparing the output of said sensitivity circuitry during the sampling of a given line with code signals representing the past connection requirement status of said given line; and means responsive to the output of said status detector for generating a signal reflecting the present connection requirement of said given line.

22. A signal controlled transmission system comprising:

a plurality of signal bearing lines;

common time-shared means for periodically translating the signal on a selected line into selected line activity signal;

common time-shared variable scale timing circuitry for generating a timing signal at selected intervals in synchronism with the generation of said line activity signal for said selected line;

common time-shared status detector for comparing said line activity signal, said timing signals and the past connection requirement status of said selected line to determine the present connection requirement status of said line.

23. The system of claim 22 wherein the time scale on which said timing circuitry operates in timing intervals for said selected line is determined by the connection requirement status of that line.

24. The system of claim 22 wherein said timing circuitry alters the timing count for said selected line in response to the application of said line activity signal for that line.

References Cited

UNITED STATES PATENTS 3,311,707 3/1967 Urquhart-Pullen.

RALPH D. BLAKESLEE, Primary Examiner